US011852504B2

United States Patent
Andoh et al.

(10) Patent No.: US 11,852,504 B2
(45) Date of Patent: Dec. 26, 2023

(54) SENSOR DEVICE, SPEED REDUCER, TRAVELING UNIT FOR CRAWLER, FLUID VALVE, FLUID CYLINDER, FLUID PUMP, FLUID COMPRESSOR, ELECTRIC MOTOR, ELECTRIC ACTUATOR, CONSTRUCTION, METHOD EXECUTED BY SENSOR DEVICE, SENSOR SYSTEM, AND NOMENCLATURE PLATE

(71) Applicant: NABTESCO CORPORATION, Tokyo (JP)

(72) Inventors: Kiyoshi Andoh, Tokyo (JP); Takashi Wada, Kobe (JP); Hiroyuki Inoue, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/712,616

(22) Filed: Apr. 4, 2022

(65) Prior Publication Data
US 2022/0221315 A1    Jul. 14, 2022

Related U.S. Application Data

(63) Continuation of application No. PCT/JP2020/036956, filed on Sep. 29, 2020.

(30) Foreign Application Priority Data
Oct. 2, 2019   (JP) .................................. 2019-182542

(51) Int. Cl.
*G01D 21/00*     (2006.01)
*H02J 50/20*     (2016.01)

(52) U.S. Cl.
CPC .............. *G01D 21/00* (2013.01); *H02J 50/20* (2016.02)

(58) Field of Classification Search
CPC ....... G01D 21/00; G01D 11/245; G01D 11/30; G01D 11/00; H02J 7/35; H02J 50/001;
(Continued)

(56) References Cited

U.S. PATENT DOCUMENTS 5,500,635 A  *  3/1996  Mott ..................... H03K 17/964
                                              36/137
2007/0139216 A1*  6/2007  Breed ..................... G08C 17/00
                                              340/13.24

(Continued)

FOREIGN PATENT DOCUMENTS

CN    108431884 A    8/2018
JP    H1156818 A    3/1999
(Continued)

OTHER PUBLICATIONS

PCT International Preliminary Report on Patentability with Written Opinion of the International Searching Authority for International Application No. PCT/JP2020/036956; dated Apr. 5, 2022.
(Continued)

*Primary Examiner* — Jeffrey P Aiello
(74) *Attorney, Agent, or Firm* — CANTOR COLBURN LLP

(57) ABSTRACT

A sensor device is attached to, for example, a mechanical component. The sensor device includes a sensor unit, an output unit, and an energy harvesting unit. The sensor unit measures a condition related to the mechanical component. The output unit outputs information that is based on the measurement result from the sensor unit to the outside. The energy harvesting unit converts energy that exists in an external environment into electric power and supplies an electric power for operating at least one of the sensor unit and the output unit.

13 Claims, 32 Drawing Sheets

(58) Field of Classification Search
CPC ........ H02J 50/20; H02J 7/32; H02J 13/00002; G08C 19/00; G08C 17/00; G08C 2201/112; G01M 13/045; G01M 13/028
USPC ......... 310/306, 339, 800; 417/53; 701/1, 45; 702/3, 33–35, 42, 53, 56, 104, 127–130, 702/150, 182
See application file for complete search history.

(56) References Cited

U.S. PATENT DOCUMENTS

| | | | | |
|---|---|---|---|---|
| 2017/0214100 A1* | 7/2017 | Kim | ................ | H01L 31/022425 |
| 2018/0351404 A1* | 12/2018 | Kim | ................ | H02M 7/217 |
| 2020/0251912 A1* | 8/2020 | Dvorsky | ................ | H02J 50/80 |
| 2020/0405239 A1* | 12/2020 | Trabish | ................ | H01Q 5/10 |
| 2022/0045554 A1* | 2/2022 | Leabman | ................ | H02J 50/40 |

FOREIGN PATENT DOCUMENTS

| | | | | |
|---|---|---|---|---|
| JP | 2002243755 A | 8/2002 | | |
| JP | 2010237017 A | 10/2010 | | |
| JP | 2012053819 A | 3/2012 | | |
| JP | 2017078911 A | 4/2017 | | |
| JP | 2017083328 A | 5/2017 | | |
| JP | 2017151016 A | 8/2017 | | |
| JP | 2017157212 A | 9/2017 | | |
| JP | 2018104068 A | 7/2018 | | |
| WO | WO-2008157298 A2 * | 12/2008 | .......... | G01D 11/245 |
| WO | 2010100870 A1 | 9/2010 | | |
| WO | 2013187473 A | 12/2013 | | |
| WO | 2016068295 A1 | 5/2016 | | |

OTHER PUBLICATIONS

International Search Report for International Application No. PCT/JP2020/036956; dated Dec. 15, 2020.
TIPO Notification of Reasons for Rejection for corresponding TW Application No. 109134201; dated Jul. 5, 2021.
TIPO Notification of Review Opinion for corresponding TW Application No. 109134201; dated Apr. 12, 2022.
JPO Notification of Reasons for Refusal for corresponding JP Application No. 2021-551320; dated Dec. 6, 2022.
TIPO Initial Examination Refusal Decision for corresponding TW Application No. 109134201; dated Nov. 8, 2022.

* cited by examiner

SPEED REDUCER MAIN UNIT SIDE

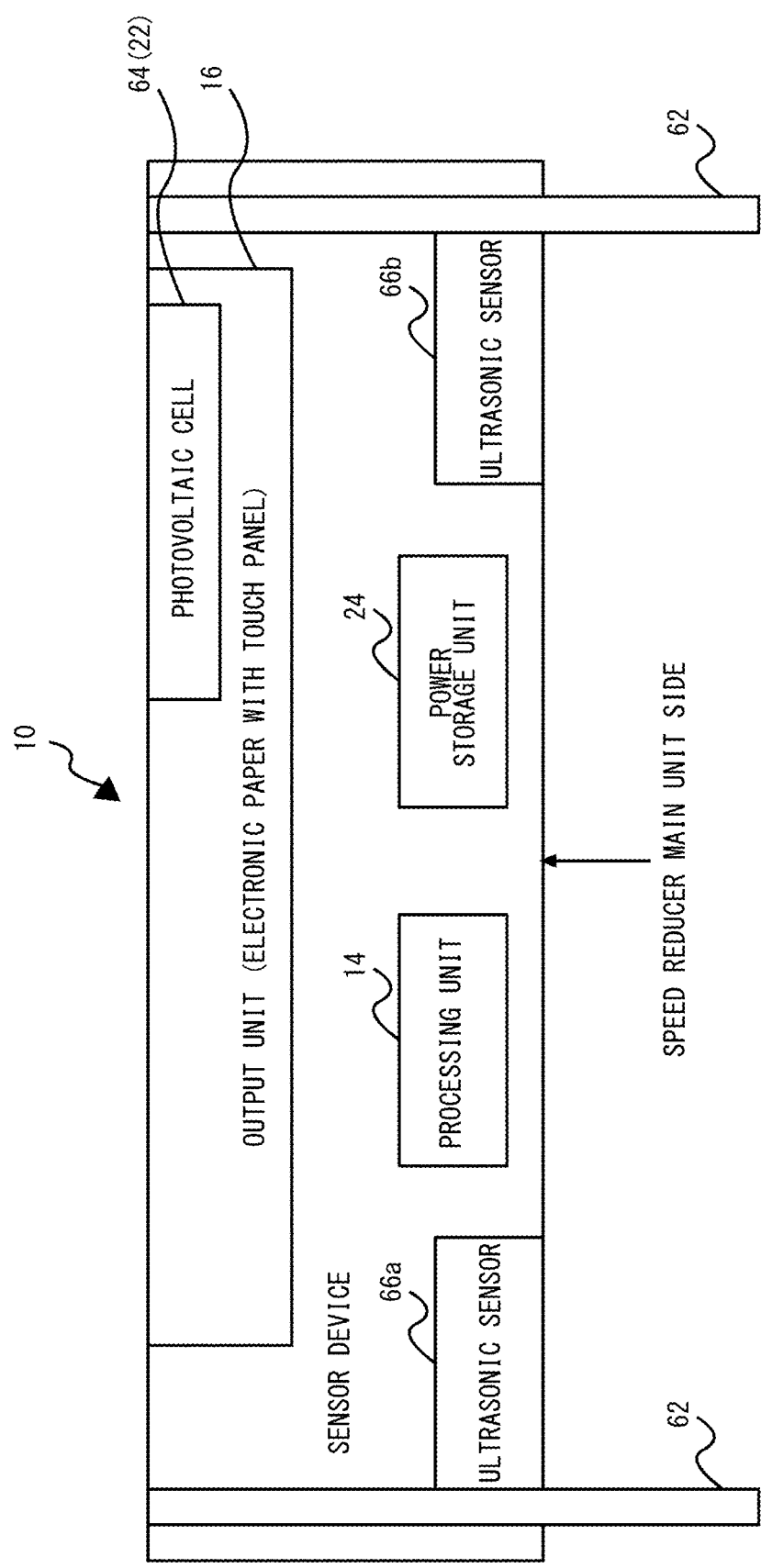

SENSOR DEVICE, SPEED REDUCER,
TRAVELING UNIT FOR CRAWLER, FLUID
VALVE, FLUID CYLINDER, FLUID PUMP,
FLUID COMPRESSOR, ELECTRIC MOTOR,
ELECTRIC ACTUATOR, CONSTRUCTION,
METHOD EXECUTED BY SENSOR DEVICE,
SENSOR SYSTEM, AND NOMENCLATURE
PLATE

CROSS REFERENCES TO RELATED
APPLICATIONS

This application is a continuation under 35 U.S.C. § 120 of PCT/JP2020/036956, filed Sep. 29, 2020, which is incorporated herein by reference, and which claimed priority to Japanese Application No. 2019-182542, filed Oct. 2, 2019. The present application likewise claims priority under 35 U.S.C. § 119 to Japanese Application No. 2019-182542, filed Oct. 2, 2019, the entire content of which is also incorporated herein by reference.

1. FIELD OF THE INVENTION

The present invention relates to a data processing technology and particularly relates to a sensor device, a speed reducer, a traveling unit for a crawler, a fluid valve, a fluid cylinder, a fluid pump, a fluid compressor, an electric motor, an electric actuator, a construction, a method executed by the sensor device, a sensor system, and a nomenclature plate.

2. DESCRIPTION OF THE RELATED ART

A technology has been suggested for monitoring the condition of a machine component by providing a sensor inside the machine component and transmitting the output of the sensor to an electric circuit outside the machine component by wire communication (for example, see Patent Literature 1).
[Patent Literature 1] Japanese Patent Application Publication No. 2018-096451

The technology described in the above Patent Literature 1 newly requires wiring for supplying electric power to a sensor provided in a mechanical component. Therefore, the cost and period of time required for the manufacturing of the mechanical component may increase.

SUMMARY OF THE INVENTION

In this background, one of the purposes of the present invention is to allow for the efficient grasping of a condition related to a mechanical component.

A sensor device according to one embodiment of the present invention includes: a sensor unit that measures a condition related to an object; an output unit that outputs information that is based on the measurement result from the sensor unit to the outside; and a power generation unit that converts energy that exists in an external environment into electric power and supplies an electric power for operating at least one of the sensor unit and the output unit. The sensor unit, the output unit, and the power generation unit are integrally provided in a sheet shape, and at least two of the sensor unit, the output unit, and the power generation unit are arranged in an overlapping manner.

Another embodiment of the present invention also relates to a sensor device. The device includes: a sensor unit that measures temperature, humidity, and vibration of an object or the surroundings of the object; an output unit that outputs information that is based on the measurement result from the sensor unit to the outside by wireless communication; and a power generation unit that generates electric power based on Wi-Fi (registered trademark) radio waves, near field communication (NFC) radio waves, or light so as to supply electric power that operates at least one of the sensor unit and the output unit.

Still another embodiment of the present invention relates to a speed reducer. This speed reducer includes: a speed reduction mechanism; a case that houses the speed reduction mechanism; a sensor unit that measures a condition related to the case; an output unit that outputs information that is based on the measurement result from the sensor unit to the outside; and a power generation unit that converts energy that exists in an external environment into electric power and supplies an electric power for operating at least one of the sensor unit and the output unit.

Still another embodiment of the present invention relates to a traveling unit for a crawler. This traveling unit for a crawler includes: a traveling control unit that controls the operation of the crawler; a case that houses the traveling control unit; a sensor unit that measures a condition related to the case; an output unit that outputs information that is based on the measurement result from the sensor unit to the outside; and a power generation unit that converts energy that exists in an external environment into electric power and supplies an electric power for operating at least one of the sensor unit and the output unit.

Still another embodiment of the present invention relates to a fluid valve. This fluid valve includes: a valve unit that controls the flow of fluid; a case that houses the valve unit; a sensor unit that measures a condition related to the case; an output unit that outputs information that is based on the measurement result from the sensor unit to the outside; and a power generation unit that converts energy that exists in an external environment into electric power and supplies an electric power for operating at least one of the sensor unit and the output unit.

Still another embodiment of the present invention relates to a fluid cylinder. This fluid cylinder includes: a cylinder unit that houses fluid; a case that houses the cylinder unit; a sensor unit that measures a condition related to the case; an output unit that outputs information that is based on the measurement result from the sensor unit to the outside; and a power generation unit that converts energy that exists in an external environment into electric power and supplies an electric power for operating at least one of the sensor unit and the output unit.

Still another embodiment of the present invention relates to a fluid pump. This fluid pump includes: a pump unit that controls the flow of fluid; a case that houses the pump unit; a sensor unit that measures a condition related to the case; an output unit that outputs information that is based on the measurement result from the sensor unit to the outside; and a power generation unit that converts energy that exists in an external environment into electric power and supplies an electric power for operating at least one of the sensor unit and the output unit.

Still another embodiment of the present invention relates to a fluid compressor. This fluid compressor includes: a compression unit that applies pressure to fluid; a case that houses the compression unit; a sensor unit that measures a condition related to the case; an output unit that outputs information that is based on the measurement result from the sensor unit to the outside; and a power generation unit that converts energy that exists in an external environment into electric power and supplies an electric power for operating at least one of the sensor unit and the output unit.

Still another embodiment of the present invention relates to an electric motor. This electric motor includes: a motor unit that converts electrical energy into mechanical energy; a case that houses the motor unit; a sensor unit that measures a condition related to the case; an output unit that outputs information that is based on the measurement result from the sensor unit to the outside; and a power generation unit that converts energy that exists in an external environment into electric power and supplies the electric power as electric power for operating at least one of the sensor unit and the output unit.

Still another embodiment of the present invention relates to an electric actuator. This electric actuator includes: a drive unit that operates based on electrical energy; a case that houses the drive unit; a sensor unit that measures a condition related to the case; an output unit that outputs information that is based on the measurement result from the sensor unit to the outside; and a power generation unit that converts energy that exists in an external environment into electric power and supplies an electric power for operating at least one of the sensor unit and the output unit.

Still another embodiment of the present invention relates to a construction. This construction includes: a predetermined physical structure; a sensor unit that measures the condition related to the physical structure; an output unit that outputs information that is based on the measurement result from the sensor unit to the outside; and a power generation unit that converts energy that exists in an external environment into electric power and supplies an electric power for operating at least one of the sensor unit and the output unit. The sensor unit, the output unit, and the power generation unit are integrally provided in a sheet shape, and at least two of the sensor unit, the output unit, and the power generation unit are arranged in an overlapping manner.

Still another embodiment of the present invention relates to a method. This method is performed by a sensor device that comes into contact with an object having a predetermined physical structure and includes: detecting performed by measuring a condition related to the object; outputting information that is based on the measurement result in the detecting to the outside; and converting energy that exists in an external environment into electric power and supplying electric power for executing at least one of the respective processes of the detecting and the outputting.

Still another embodiment of the present invention also relates to a method. This method is a method performed by a sensor device attached to a part and includes: using electric power generated by the sensor device so as to detect a condition related to the part during the transportation or storage of the part; and outputting information that is based on the detection result to the outside.

Still another embodiment of the present invention relates to a sensor system. This sensor system includes: an object having a predetermined physical structure; and a sensor device attached to the object. The sensor device includes: a sensor unit that measures the condition related to the object; an output unit that outputs information that is based on the measurement result from the sensor unit to the outside; and a power generation unit that converts energy that exists in an external environment into electric power and supplies an electric power for operating at least one of the sensor unit and the output unit. The sensor unit, the output unit, and the power generation unit are integrally provided in a sheet shape, and at least two of the sensor unit, the output unit, and the power generation unit are arranged in an overlapping manner.

Still another embodiment of the present invention also relates to a sensor system. This sensor system includes: an object having a predetermined physical structure; and a plurality of sensor devices attached to the object. Each of the plurality of sensor devices includes: a sensor unit that measures the condition related to the object; an output unit that outputs information that is based on the measurement result from the sensor unit to the outside; and a power generation unit that converts energy that exists in an external environment into electric power and supplies an electric power for operating at least one of the sensor unit and the output unit. The sensor unit, the output unit, and the power generation unit are integrally provided in a sheet shape, and at least two of the sensor unit, the output unit, and the power generation unit are arranged in an overlapping manner.

Still another embodiment of the present invention relates to a nomenclature plate. This nomenclature plate is a nomenclature that is attached to an article and on which information related to the article is displayed and includes: a sensor unit that measures the condition of the article; an output unit that outputs information that is based on the measurement result from the sensor unit to the outside; and a power generation unit that converts energy that exists in an external environment into electric power and supplies an electric power for operating at least one of the sensor unit and the output unit. At least two of the sensor unit, the output unit, and the power generation unit are arranged in an overlapping manner.

Optional combinations of the aforementioned constituting elements, and implementations of the invention in the form of apparatuses, systems, methods, computer programs, and recording media storing computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 11C is a diagram showing an example of the functional blocks of the sensor device of FIG. 11A and FIG. 11B;

DETAILED DESCRIPTION OF THE INVENTION

The invention will now be described by reference to the preferred embodiments. This does not intend to limit the scope of the present invention, but to exemplify the invention.

The technology described in the above Patent Literature 1 requires a place to arrange the sensor inside the mechanical component and further requires wiring for supplying power to the sensor. Therefore, the cost and period of time required for the manufacturing of the mechanical component may increase.

Therefore, in an exemplary embodiment, a nomenclature plate attached to the surface of a mechanical component (parts and the like) is used as a sensor device. The sensor device in the exemplary embodiment, in other words, the nomenclature plate attached to the machine component detects a condition related to the machine component before the actual use during the transportation or storage of the machine component, in other words, after the manufacturing of the machine component by using power generated by the sensor device itself. Then, information based on the detection result is output to the outside.

More specifically, the sensor device in the exemplary embodiment includes (1) a sensor unit that measures (can be said to detect) the condition of an attached mechanical component and the condition of the surrounding environment of the mechanical component, (2) an output unit that outputs information based on a measurement result (can be said to be a detection result) from the sensor unit, and (3) an energy harvesting unit that self-generates electricity for operating the sensor unit and the output unit using Wi-Fi (registered trademark) radio waves, etc. This eliminates the need to secure a location for the sensor to be placed inside the mechanical component and to provide new wiring for supplying electric power to the sensor. In other words, while making it possible to grasp the condition related to machine component, it is possible to suppress an increase in the cost and period of time required for manufacturing the machine component.

Figure 1:
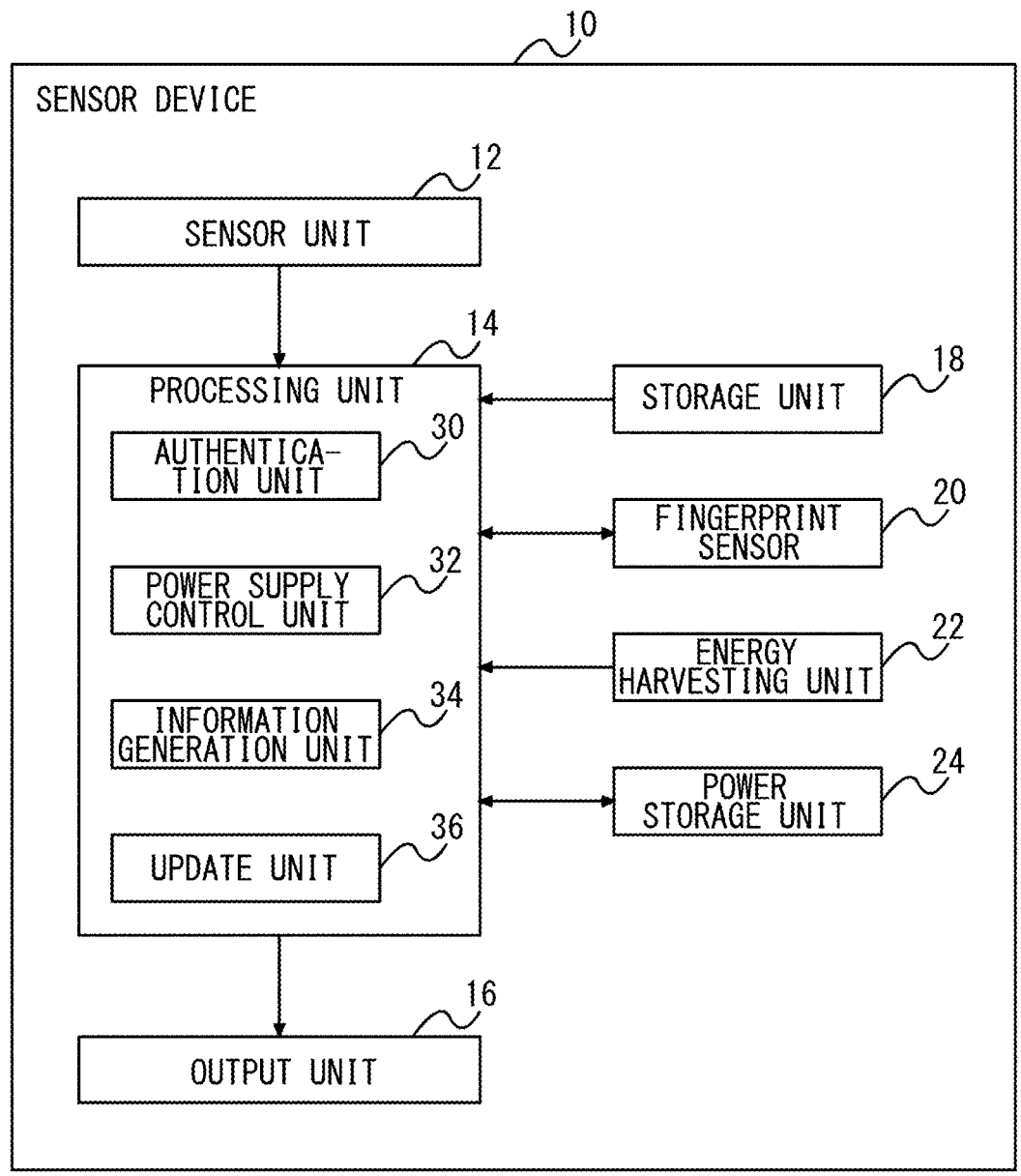
FIG. 1 is a block diagram showing functional blocks of a sensor device according to an exemplary embodiment.

FIG. 1 is a block diagram showing functional blocks of a sensor device 10 according to an exemplary embodiment. The figure shows an example of functional blocks included in the sensor device 10 according to the exemplary embodiment. Each block shown in the block diagrams of the present specification is implemented in hardware such as elements, electronic circuits, or mechanical devices such as a processor, a CPU, and a memory of a computer, and in software such as a computer program. The figure depicts functional blocks implemented by the cooperation of the hardware and the software. Thus, a person skilled in the art should appreciate that there are many ways of accomplishing these functional blocks in various forms in accordance with the components of hardware, software, or the combination of both.

The sensor device 10 is attached to the surface of an article (hereinafter, also referred to as an "object") having a predetermined physical structure as a nomenclature plate. The sensor device 10 includes a sensor unit 12, a processing unit 14, an output unit 16, a storage unit 18, a fingerprint sensor 20, an energy harvesting unit 22, and a power storage unit 24. The sensor device 10 displays information regarding the object on the surface (outer surface) thereof as a nomenclature plate. Further, in the sensor device 10, members corresponding to the functional blocks shown in FIG. 1 are integrally provided in a sheet shape. The sheet shape means that the length of the sensor device 10 in the thickness direction is shorter than the length in the vertical direction and the length in the horizontal direction of the sensor device 10. For example, when the length in the vertical direction and the length in the horizontal direction of the sensor device 10 are several centimeters, the length in the thickness direction of the sensor device 10 is 4 mm or less. Further, the length of the sensor device 10 in the thickness direction is desirably 1 mm or less. The length of the sensor device 10 in the thickness direction is more desirably 0.5 mm or less. Since the sensor device is attached to the surface of the object as a nomenclature plate, having a thin thickness is more desirable since the amount of protrusion from the object becomes small. The housing of the sensor device 10 may be formed of a material having high flexibility (plasticity) or may be formed of a material having low flexibility (plasticity).

The sensor unit 12 is provided so as to come into contact with (including being in proximity) to the object and measures the condition related to the object to which the sensor device 10 is attached. The object may be various types of electronic devices, electrical devices, mechanical devices, parts or finished products. The sensor unit 12 outputs a signal (hereinafter, also referred to as "detection signal") based on the measurement result (detection result) to the processing unit 14.

The condition related to the object measured by the sensor unit 12 may be either one or both of the state of the object itself (the state of either the inside or the surface of the object or both) and the state of the surroundings of the object (in other words, the environment surrounding the object). Further, the condition related to the object may be one type of physical state or physical quantity or may be a combination of a plurality of types of physical states or physical quantities. For example, the condition related to the object may be any one of vibration (in other words, 3-axis acceleration), temperature, humidity, sound, ultrasonic waves, distortion, atmospheric pressure, illuminance, global positioning system (GPS) (for example, position data measured using GPS), Bluetooth low energy (BLE) ("Bluetooth" is a registered trademark) beacon (e.g., position data measured using a BLE beacon), submersion degree, and wind power or any combination of these. Furthermore, the condition related to the object may include a chemical state. The chemical state may be, for example, the presence or absence of certain chemicals such as odor, acidity, neutrality, alkalinity, or allergens.

The processing unit 14 generates information (hereinafter, also referred to as "output information") output from the output unit 16 based on a detection signal output from the sensor unit in the exemplary embodiment, which is the measurement result from the sensor unit 12. The processing unit 14 may execute a predetermined arithmetic operation (for example, various filter processes, abnormality diagnosis processes by an artificial intelligence function, etc.) based on the detection signal output from the sensor unit 12 and generate output information including the arithmetic operation result. This allows the data amount of the output information to be reduced.

The output unit 16 outputs the output information generated by the processing unit 14 to the outside in the exemplary embodiment, which is information based on the measurement result from the sensor unit 12. The storage unit 18 stores the measurement result from the sensor unit 12 (detection signal in the exemplary embodiment) or the information output from the output unit 16 (output information in the exemplary embodiment). In the exemplary embodiment, the storage unit 18 stores the output information generated by the processing unit 14 and further stores fingerprint data of an operator who is authorized to operate the sensor device 10 (in other words, an operator who has the authority to operate the sensor device 10).

The storage unit 18 may have storage capacity capable of storing a plurality of measurement results from the sensor unit 12 (for example, a plurality of detection signals output from the sensor unit 12) or a plurality of pieces of output information. The storage unit 18 may store the plurality of measurement results or the plurality of pieces of output information in association with a value that changes over time. The value that changes over time can be considered as a value that changes over the passage of time and may be a counter value or a time value that is counted up or countered down over time. This allows the plurality of measurement results or the plurality of pieces of output information to be held in chronological order.

For example, the processing unit 14 may store a plurality of pieces of output information generated based on the plurality of measurement results from the sensor unit 12 in the storage unit 18 in correspondence with a time value output from a real-time clock (or a GPS device). The processing unit 14 may aggregate or totalize the plurality of pieces of output information stored in the storage unit 18 based on the time value and generate new output information based on the aggregation result or the totalization result. In this case, the output unit 16 may output the new output information to the outside along with individual output information based on an individual measurement result or in place of the individual output information.

When the sensor unit 12 includes a plurality of sensors, the storage unit 18 may hold a detection signal from each sensor (or output information based on each detection signal) in association with each other based on the counter value, the time value, or the like. Alternatively, the storage unit 18 may separately hold the detection signal from each sensor (or output information based on each detection signal).

Further, the storage unit 18 may store the identification information (identification number) of the sensor unit 12 in correspondence with the detection signal or the output information. When the sensor unit 12 includes a plurality of sensors, the storage unit 18 may store a detection signal from each sensor or output information based on the signal in correspondence with the identification information of the sensor. Further, the storage unit 18 may further store the identification information (may be a product type) of the object. Further, the storage unit 18 may be provided independently of the processing unit 14 or may be configured to be removable from the sensor device 10.

The output unit 16 may include electronic paper or a liquid crystal display as a display unit, and the output information generated by the processing unit 14 may be displayed on the electronic paper or the liquid crystal display. When the output unit 16 is formed using electronic paper or a liquid crystal display, the output unit 16 preferably includes a touch panel. In this case, in normal times, the output unit 16 may display information to be displayed on a nomenclature plate (which can also be called default information and includes, for example, product name and manufacturer information). On the other hand, when a predetermined operation is input via the touch panel, the output unit 16 (processing unit 14) may update screen display content so as to display the detection result from the sensor unit 12 and the output information stored in the storage unit 18.

Further, the output unit 16 may include an antenna as a communication unit. In this case, the output unit 16 may transmit the output information generated by the processing unit 14 to an external device by using Wi-Fi, BLE, NFC, or the like.

The fingerprint sensor 20 is a sensor that reads a fingerprint from a finger of the operator of the sensor device 10. The fingerprint sensor 20 may be integrated with the output unit 16 that includes electronic paper or a liquid crystal display.

The energy harvesting unit 22 converts energy existing in the environment (external environment) around the sensor device 10 into electric power (so-called energy harvesting) and supplies the electric power (the generated electric power) as the electric power for operating at least one of the sensor unit 12 and the output unit 16 (each unit in FIG. 1 in the exemplary embodiment). For example, the sensor unit 12, the processing unit 14, the output unit 16, the storage unit 18, and the fingerprint sensor 20 in FIG. 1 operate based on the electric power supplied from the energy harvesting unit 22. The energy harvesting unit 22 may generate electric power based on at least one of energy: temperature; humidity; radio waves such as Wi-Fi; electromagnetic waves from the surroundings of the sensor device 10 (including radiation and cosmic rays and also includes electromagnetic noise emitted from an electric motor or the like); vibration; sound (including ultrasonic waves); light (including visible light, infrared light, and ultraviolet light); and flow of fluid or powder (wind, wave, etc.).

For example, the energy harvesting unit 22 may convert Wi-Fi radio waves into direct current by using the technology described in "http://gigazine.net/news/20190129-wifi-rectenna/", "http://news.mitedu/2019/converting-wi-fi-signals-electricity-0128", or the like. Further, the energy harvesting unit 22 may supply electric power to each unit based on electromotive force generated by short-range wireless communication (NFC or the like). The energy harvesting unit 22 that includes such a communication function may execute data communication and power generation in a time-division manner, in other words, may execute data communication and power generation alternately.

The power storage unit 24 stores the electricity generated by the energy harvesting unit 22 and supplies the stored electric power to each unit in FIG. 1. For example, the sensor unit 12, the processing unit 14, the output unit 16, the storage unit 18, and the fingerprint sensor 20 in FIG. 1 can operate based on the electric power supplied from the energy harvesting unit 22 and can further operate using the electric power supplied from the power storage unit 24. The power storage unit 24 may be a capacitor (including an electric double layer capacitor) or a secondary battery (for example, a lithium ion battery, a solid lithium ion battery, an air battery, etc.).

The processing unit 14 includes an authentication unit 30, a power supply control unit 32, an information generation unit 34, and an update unit 36. When the fingerprint data of an operator read by the fingerprint sensor 20 matches the fingerprint data of an authorized operator stored in advance in the storage unit 18, the authentication unit 30 determines that the authentication of the operator has been successful. When the processing unit 14 determines that the authentication unit 30 has succeeded in authenticating the operator, the processing unit 14 causes output information to be output from the output unit 16 in accordance with operation by the operator.

Figure 2:
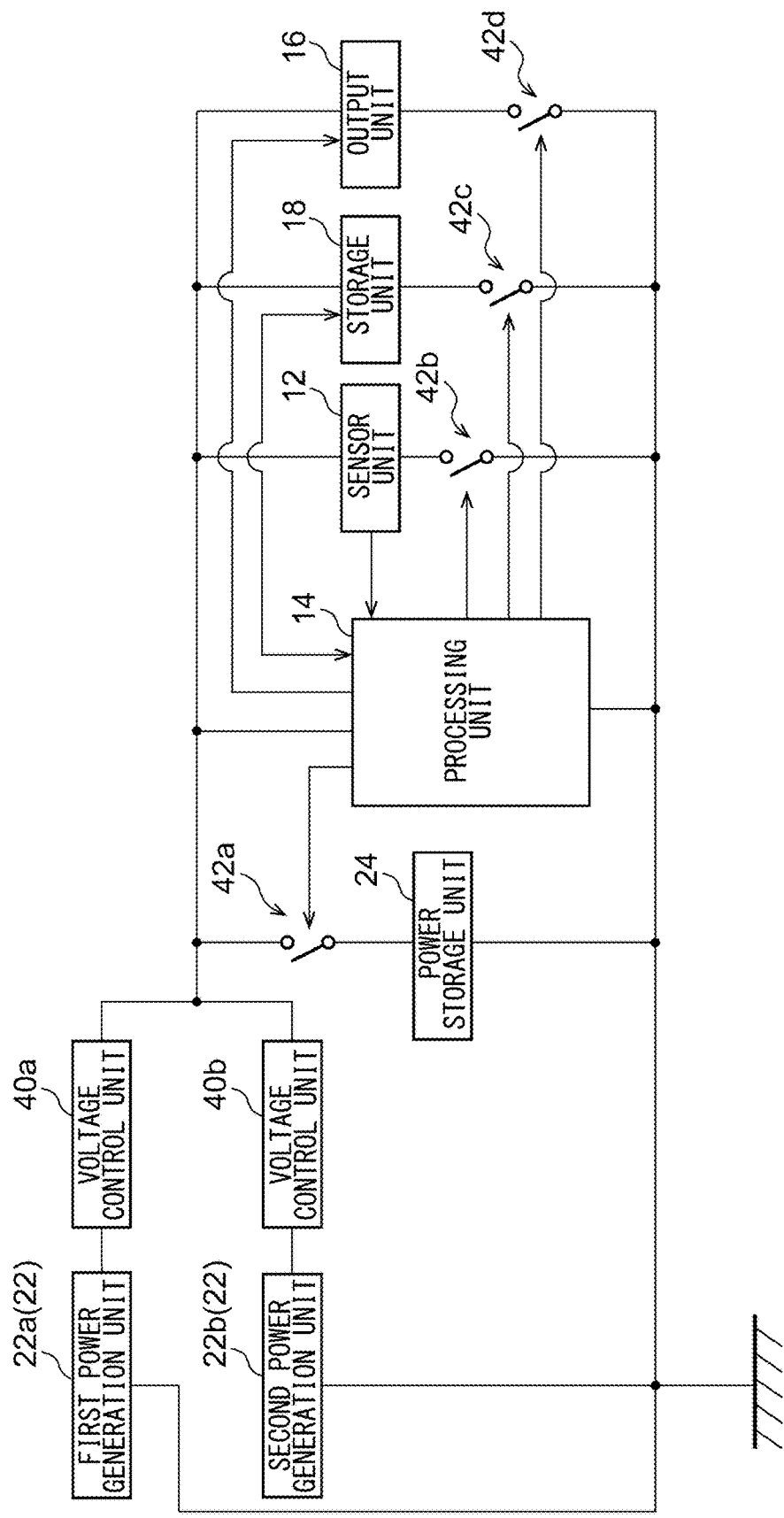
FIG. 2 shows a circuit configuration example of the sensor device according to FIG. 1.

The power supply control unit 32 controls the supply or disconnection of electric power for each unit in FIG. 1. FIG. 2 shows a circuit configuration example of the sensor device according to FIG. 1. In the example in the figure, the energy harvesting unit 22 includes a first power generation unit 22a and a second power generation unit 22b as a plurality of power generation means. For example, the first power generation unit 22a may be a power generation means using a thermoelectric conversion element, and the second power generation unit 22b may be a power generation means using a photovoltaic cell. A voltage control unit 40a controls voltage supplied from the first power generation unit 22a, and a voltage control unit 40b controls voltage supplied from the second power generation unit 22b. For example, the voltage control unit 40a and the voltage control unit 40b transform voltage supplied from each power generation unit to a level within a predetermined range.

The sensor device 10 includes a plurality of switches for controlling the supply or disconnection of electric power for each unit in FIG. 1. These switches may be semiconductor switches or mechanical relays. Further, these switches are electrically connected to the processing unit 14. The power supply control unit 32 of the processing unit 14 switches a switch 42a on when electricity generated by the first power generation unit 22a and electricity generated by the second power generation unit 22b are stored in the power storage unit 24. Further, the power supply control unit 32 switches the switch 42a on when supplying electric power from the power storage unit 24 to the sensor unit 12, the storage unit 18, and the output unit 16.

The power supply control unit 32 of the processing unit 14 switches a switch 42b on when supplying electric power to the sensor unit 12, while the power supply control unit 32 switches the switch 42b off when disconnecting the power supply to the sensor unit 12. Further, the power supply control unit 32 switches a switch 42c on when supplying electric power to the storage unit 18, while the power supply control unit 32 switches the switch 42c off when disconnecting the power supply to the storage unit 18. Further, the power supply control unit 32 switches a switch 42d on when supplying electric power to the output unit 16, while the power supply control unit 32 switches the switch 42d off when disconnecting the power supply to the output unit 16.

Referring back to FIG. 1, the information generation unit 34 generates output information output from the output unit 16 based on the detection signal output from the sensor unit 12. As described above, the information generation unit 34 may execute an arithmetic operation such as various filter processes and abnormality diagnosis processes by an artificial intelligence function based on the detection signal and generate output information including the arithmetic operation result. Further, the information generation unit 34 may aggregate or totalize the plurality of detection signals or the plurality of pieces of output information stored in the storage unit 18 so as to generate new output information.

The update unit 36 updates the data stored in the storage unit 18. For example, the update unit 36 stores the detection signal output from the sensor unit 12 or the output information generated by the information generation unit 34 in the storage unit 18. Further, when a predetermined instruction for instructing the initialization of the storage unit 18 is input, the update unit 36 deletes (in other words, initializes) the data stored in the storage unit 18. When the output unit 16 has a communication function, the above-mentioned predetermined instruction may be input from an external device via communication. Further, when the output unit 16 has a touch panel function, the predetermined instruction may be input through operation by the operator on the touch panel.

The processing unit 14 is a processor (for example, a micro control unit (MCU) or the like) whose arithmetic capacity increases as the number of operation clocks increases and may be realized by a processor capable of changing the number of operation clocks according to the processing details. In this case, a computer program in which a plurality of modules corresponding to the plurality of functional blocks in the processing unit 14 of FIG. 1 are mounted may be stored in a storage area such as the storage unit 18. Then, the function of each functional block may be exerted by the processor reading and executing the computer program. Further, the processor may execute a process for which low arithmetic capacity is sufficient (for example, the process of the power supply control unit 32) at a relatively low operation clock frequency and execute a process requiring high arithmetic capacity (for example, the process of the information generation unit 34) at a relatively high operation clock frequency. The high and low of the operation clock frequency of the processor may be specified by a computer program corresponding to each functional block.

As another aspect, the processing unit 14 may be realized by a processor having a plurality of cores with different power consumption per unit time. When the power supply from the energy harvesting unit 22 and the power storage unit 24 is less than a predetermined threshold value, the processing unit 14 may execute a data process (the process of each functional block) using a core with relatively low power consumption. On the other hand, when the power supply from the energy harvesting unit 22 and the power storage unit 24 is equal to or higher than the above threshold value, the processing unit 14 may execute the data process (the process of each functional block) using a core with relatively large power consumption. Thereby, the electric power supplied from the energy harvesting unit 22 and the power storage unit 24 can be efficiently used.

In the sensor device 10, at least two of the sensor unit 12, the output unit 16, and the energy harvesting unit 22 are arranged in an overlapping manner. Thereby, the size of the sensor device 10 can be reduced, allowing for easy attachment of the sensor device 10 to an object. For example, when the output unit 16 is electronic paper, it is necessary to secure an area of a certain size (information display area) in the vertical direction and the horizontal direction as an area for the output unit 16. In this case, the sensor unit 12 and the energy harvesting unit 22 may be arranged at a position directly below the output unit 16 in the thickness direction.

The processing unit 14, the storage unit 18, the fingerprint sensor 20, and the power storage unit 24 in FIG. 1 are not essential components. For example, when the measurement result from the sensor unit 12 is output from the output unit 16 without processing the measurement result, the processing unit 14 may be omitted. Further, when the measurement result from the sensor unit 12 is immediately output from the output unit 16, the storage unit 18 may be omitted. Further, if the authentication of the operator is not necessary, the fingerprint sensor 20 and the authentication unit 30 of the processing unit 14 may be omitted. Further, if the storage of electricity generated by the energy harvesting unit 22 is not necessary, the power storage unit 24 may be omitted.

A typical example of the sensor device 10 will be described. The sensor unit 12 may include a plurality of sensors that measure a plurality of types of physical quantities (for example, temperature, humidity, and vibration) of an object or the surroundings of the object. The output unit 16 may output output information that is based on the measurement result from the sensor unit 12 to the outside by wireless communication such as Wi-Fi or NFC. The energy harvesting unit 22 may generate electric power based on Wi-Fi radio waves, NFC radio waves, or light (sunlight or illumination light) so as to supply electric power to at least one of the sensor unit 12 and the output unit 16.

Figure 3:
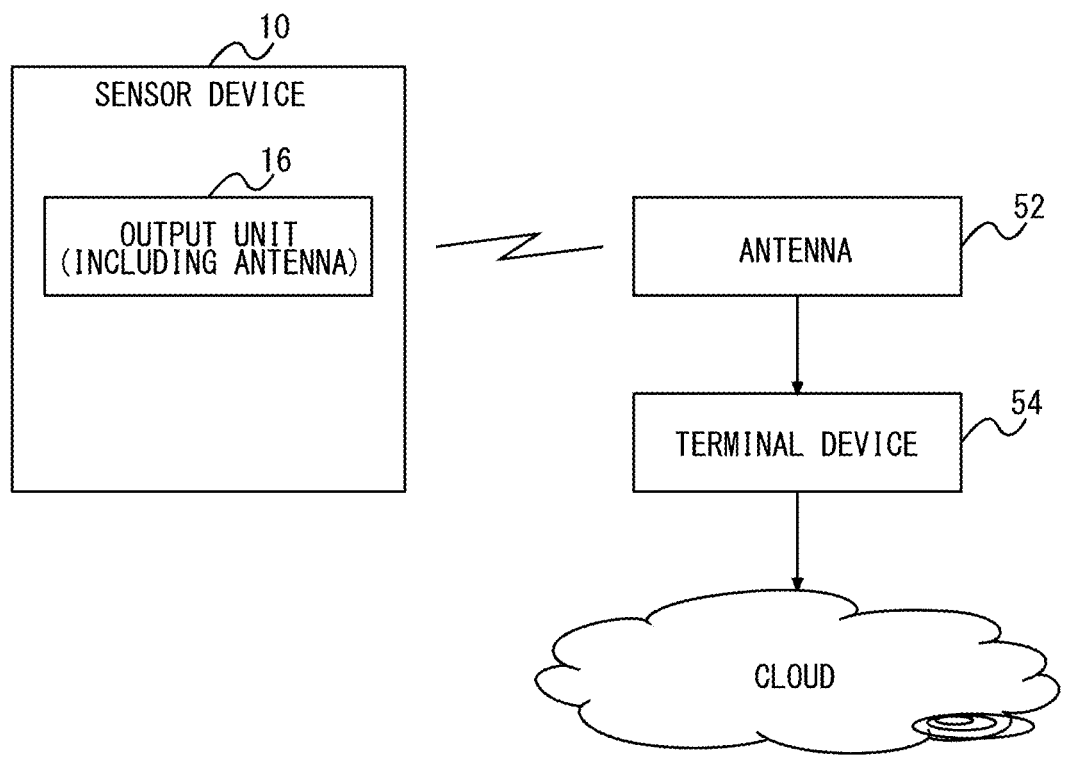
FIG. 3 is a diagram showing the configuration of a sensor system including the sensor device according to FIG. 1.

FIG. 3 shows the configuration of a sensor system 50 including the sensor device 10 according to FIG. 1. The sensor system 50 is an information processing system including the sensor device 10 and a terminal device 54. The terminal device 54 may be any of a smartphone, a PC, a drone, and a stationary gate that reads the sensor device 10. The sensor device 10 includes an antenna (in other words, a communication unit) as the output unit 16 and transmits output information to the terminal device 54. The terminal device 54 acquires the output information transmitted from the sensor device 10 via an antenna 52. The terminal device 54 may acquire the output information from a plurality of sensor devices 10 attached to a plurality of objects, associate each piece of output information with the output source sensor device 10, and store the output information in a cloud (database on the cloud, etc.).

Figure 4:
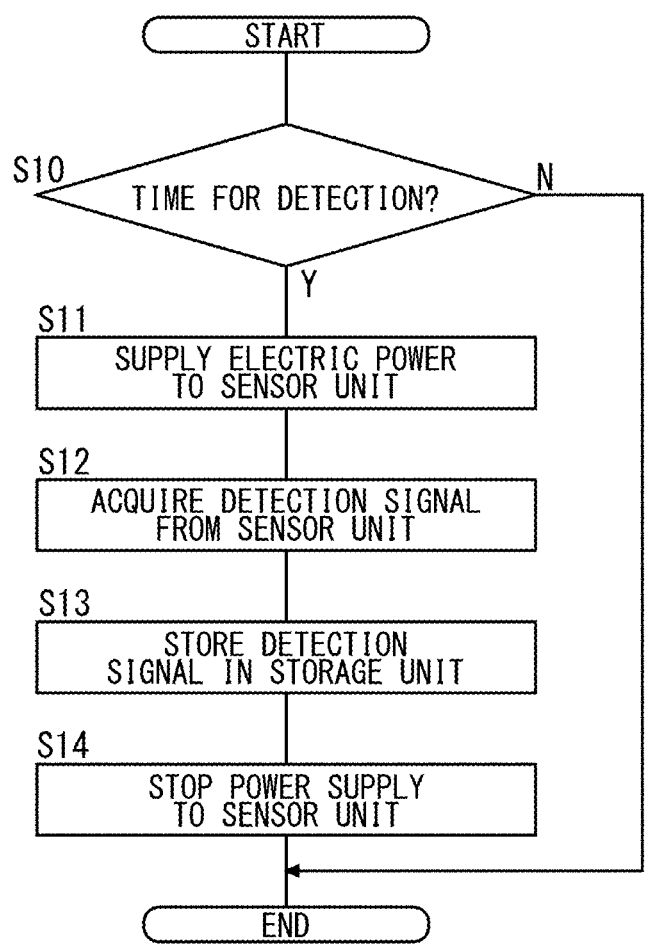
FIG. 4 is a flowchart showing an example of a sensing process performed by the sensor device.

The operation of a sensor device 10 according to the above configuration will be described. FIG. 4 is a flowchart showing an example of a sensing process performed by the sensor device 10. When the time for detecting the condition related to the object is reached (Y in S10), the power supply control unit 32 of the processing unit 14 supplies electric power to the sensor unit 12 (S11). The processing unit 14 acquires a detection signal output from the sensor unit 12 (S12). The update unit 36 of the processing unit 14 stores the detection signal in the storage unit 18 (S13). The power supply control unit 32 of the processing unit 14 stops the power supply to the sensor unit 12 (S14). If it is not the time for detecting the condition related to the object (N in S10), processes in and after S11 are skipped. The sensor device 10 repeatedly executes the sensing process in the present figure. The processing unit 14 may repeatedly execute the processes in and after S11 without performing a determination process in S10.

Figure 5:
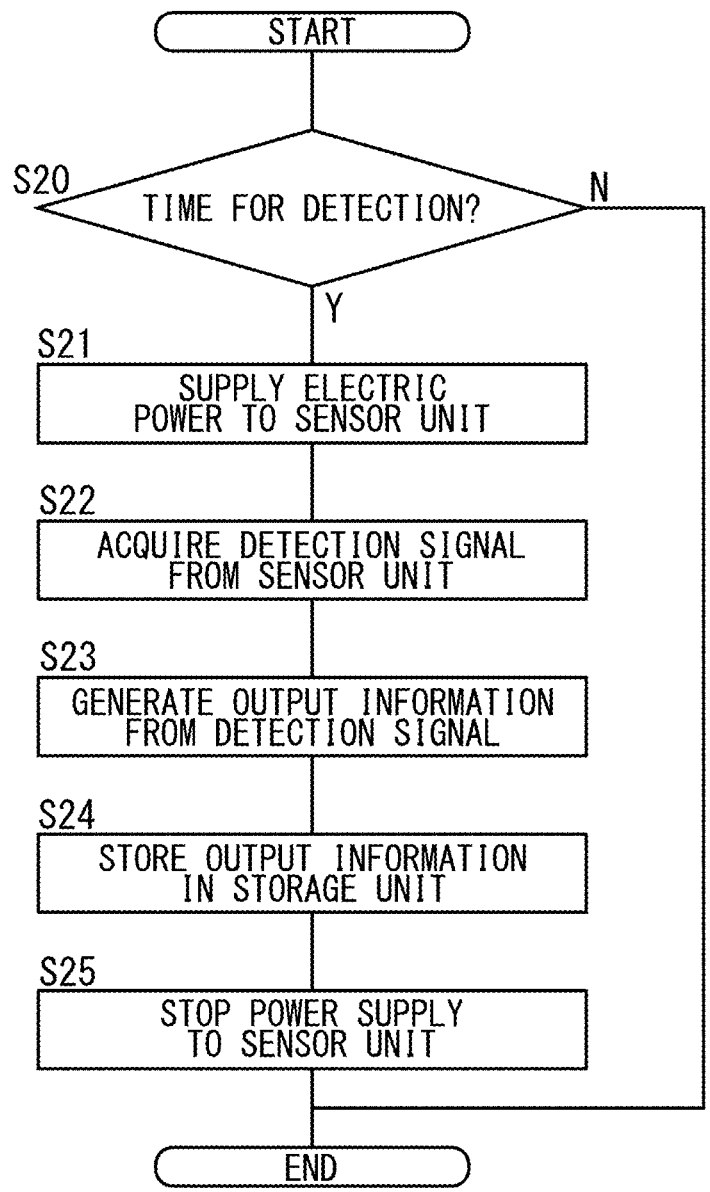
FIG. 5 is a flowchart showing another example of a sensing process performed by the sensor device.

FIG. 5 is a flowchart showing another example of the sensing process performed by the sensor device 10. When the time for detecting the condition related to the object is reached (Y in S20), the power supply control unit 32 of the processing unit 14 supplies electric power to the sensor unit 12 (S21). The processing unit 14 acquires a detection signal output from the sensor unit 12 (S22). The information generation unit 34 of the processing unit 14 executes a filter process or the like on the detection signal so as to generate output information (S23). The update unit 36 of the processing unit 14 stores the output signal in the storage unit 18 (S24). The power supply control unit 32 of the processing unit 14 stops the power supply to the sensor unit 12 (S25). If it is not the time for detecting the condition related to the object (N in S20), processes in and after S21 are skipped. The sensor device 10 repeatedly executes the sensing process in the present figure. The processes in and after S21 may be repeatedly executed without performing a determination process in S20.

Figure 6:
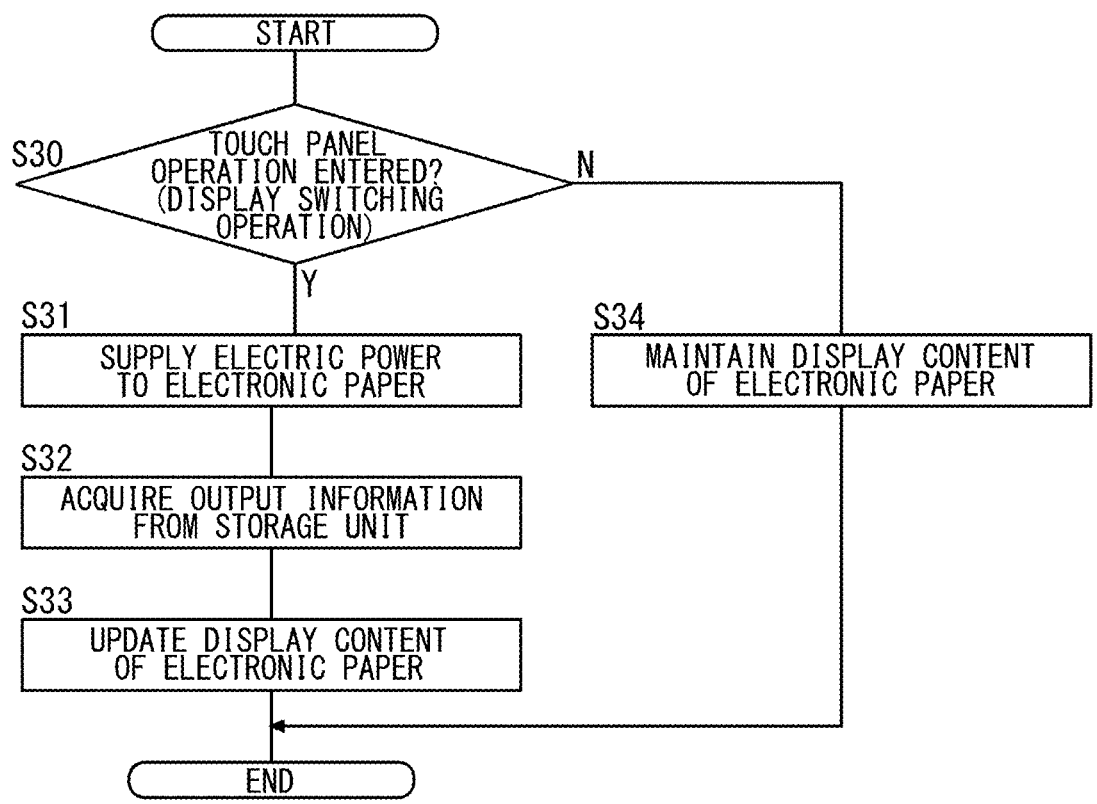
FIG. 6 is a flowchart showing an example of an information output process performed by the sensor device.

FIG. 6 is a flowchart showing an example of an information output process performed by the sensor device 10. The figure shows a process of updating the display content of electronic paper serving as the output unit 16. It is assumed that the electronic paper in this case requires power supply in order to update the display content but does not require power supply in order to maintain the display content. The electronic paper may display default information such as a product name and a manufacturer name in normal times.

When a predetermined operation for instructing display switching is input to the touch panel integrated with the output unit 16 (Y in S30), the power supply control unit 32 of the processing unit 14 supplies electric power to the electronic paper (S31). The processing unit 14 acquires the output information stored in the storage unit 18 and passes the output information to the output unit 16 (S32). The output unit 16 updates the display content of the electronic paper by applying a voltage to the electronic paper so as to display the output information passed from the processing unit 14 (S33). If an operation for instructing display switching to the touch panel has not been input (N in S30), the output unit 16 maintains the display content of the electronic paper without changing the display content (S34).

The trigger for update of the display content of the electronic paper is not limited to an operation on the touch panel. For example, the display content of the electronic paper may be updated when the electric power is supplied from the energy harvesting unit 22 by NFC or the like. Further, the display content of the electronic paper may be updated when a display update instruction from an external device is received via communication.

Figure 7:
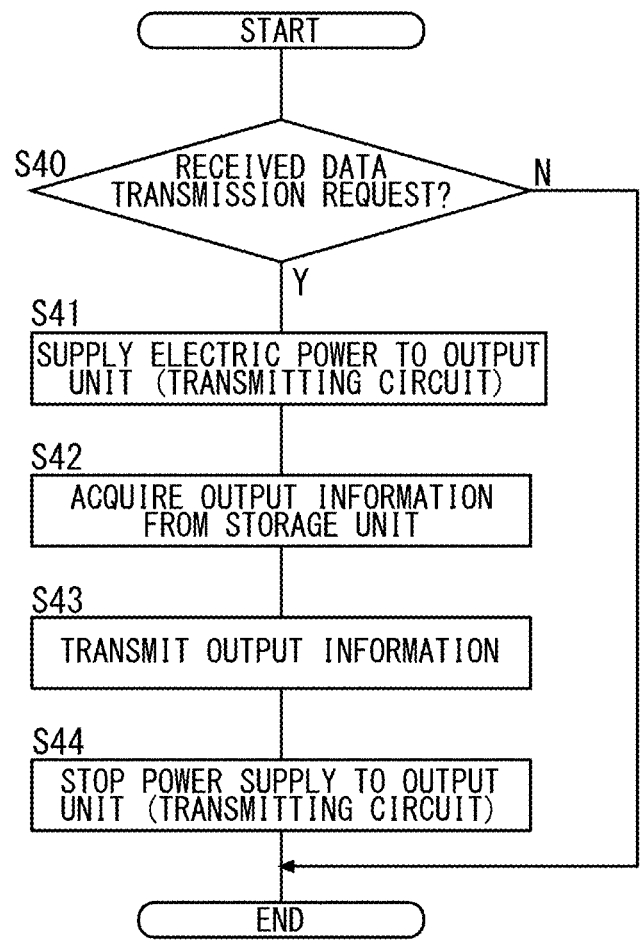
FIG. 7 is a flowchart showing another example of an information output process performed by the sensor device.

FIG. 7 is a flowchart showing another example of an information output process performed by the sensor device 10. In this case, it is assumed that the output unit 16 has an NFC function and includes a receiving circuit (including a power generation function) and a transmitting circuit. The receiving circuit of the output unit 16 functions as the energy harvesting unit 22. Specifically, upon receiving a data transmission request transmitted from an external device (Y in S40), the receiving circuit supplies electric power to the processing unit 14 based on the electromotive force generated by the communication. The power supply control unit 32 of the processing unit 14 supplies electric power to the transmitting circuit of the output unit 16 (S41). The processing unit 14 acquires the output information stored in the storage unit 18 and passes the output information to the transmitting circuit of the output unit 16 (S42). The transmitting circuit transmits the output information to the request source external device (S43). The power supply control unit 32 of the processing unit 14 stops the power supply to the transmitting circuit of the output unit 16 (S44). If the data transmission request has not been received (N in S40), processes in and after S41 are skipped. The processes in and after S41 may be executed without performing a determination process in S40.

Figure 8:
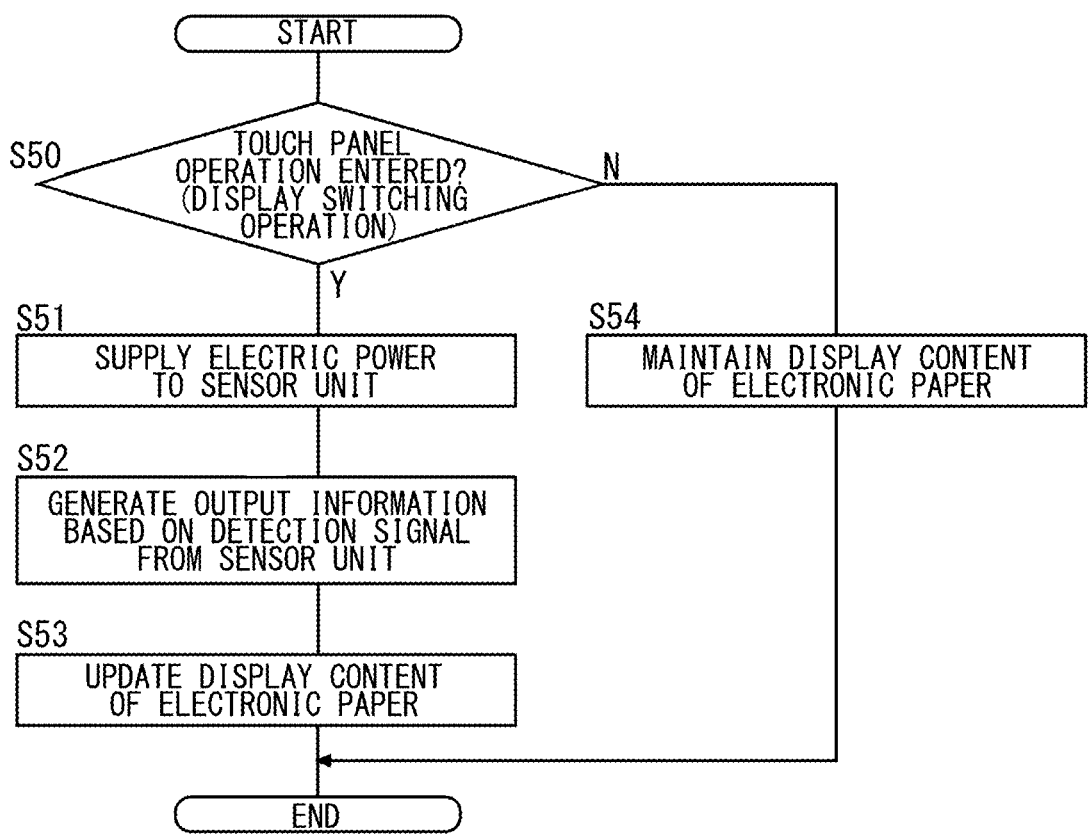
FIG. 8 is a flowchart showing another example of an information output process performed by the sensor device.

FIG. 8 is a flowchart showing another example of an information output process performed by the sensor device 10. This figure corresponds to FIG. 6. However, the sensor device 10 in the figure does not include a storage unit 18 for storing detection signals or output information. When a predetermined operation for instructing display switching is input to the touch panel integrated with the output unit 16 (Y in S50), the power supply control unit 32 of the processing unit 14 supplies electric power to the sensor unit 12 (S51). According to the details of the operation input to the touch panel, the information generation unit 34 of the processing unit 14 acquires a detection signal from the sensor unit 12 and generates output information based on the detection signal (S52). The output unit 16 updates the display content of the electronic paper by applying a voltage to the electronic paper so as to display the output information generated by the processing unit 14 (S53). If an operation for instructing display switching to the touch panel has not been input (N in S50), the output unit 16 maintains the display content of the electronic paper without changing the display content (S54).

Figure 9:
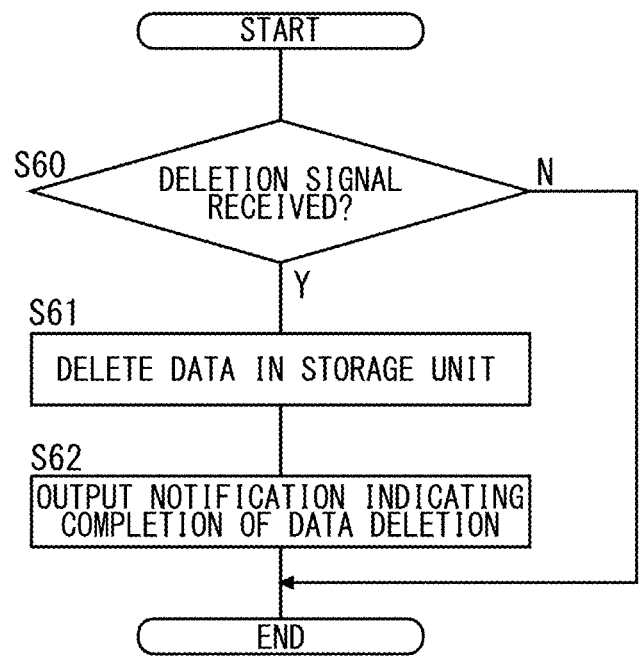
FIG. 9 is a flowchart showing an example of an initialization process performed by the sensor device.

FIG. 9 is a flowchart showing an example of an initialization process performed by the sensor device 10. When an initialization instruction (in other words, a signal instructing the deletion of storage data) is input via communication, or when an initialization instruction is input via an operation by an operator (Y in S60), the update unit 36 of the processing unit 14 initializes the storage unit 18 by deleting data stored in the storage unit 18 (S61). When the data deletion is completed, the update unit 36 passes a notification to the output unit 16 indicating that the data deletion (that is, initialization) is completed. The output unit 16 transmits the notification to the request source external device via communication or displays the notification on a display unit such as electronic paper (S62). If the initialization instruction has not been input (N in S60), processes in and after S61 are skipped.

A attachment example of a sensor device 10 to various articles will be described. In a sensor device 10 in each of the following examples, a sensor unit 12, an output unit 16, and an energy harvesting unit 22 are integrally provided in a sheet shape as described above. Further, at least two of the sensor unit 12, the output unit 16, and the energy harvesting unit 22 are arranged in an overlapping manner.

Figure 10A:
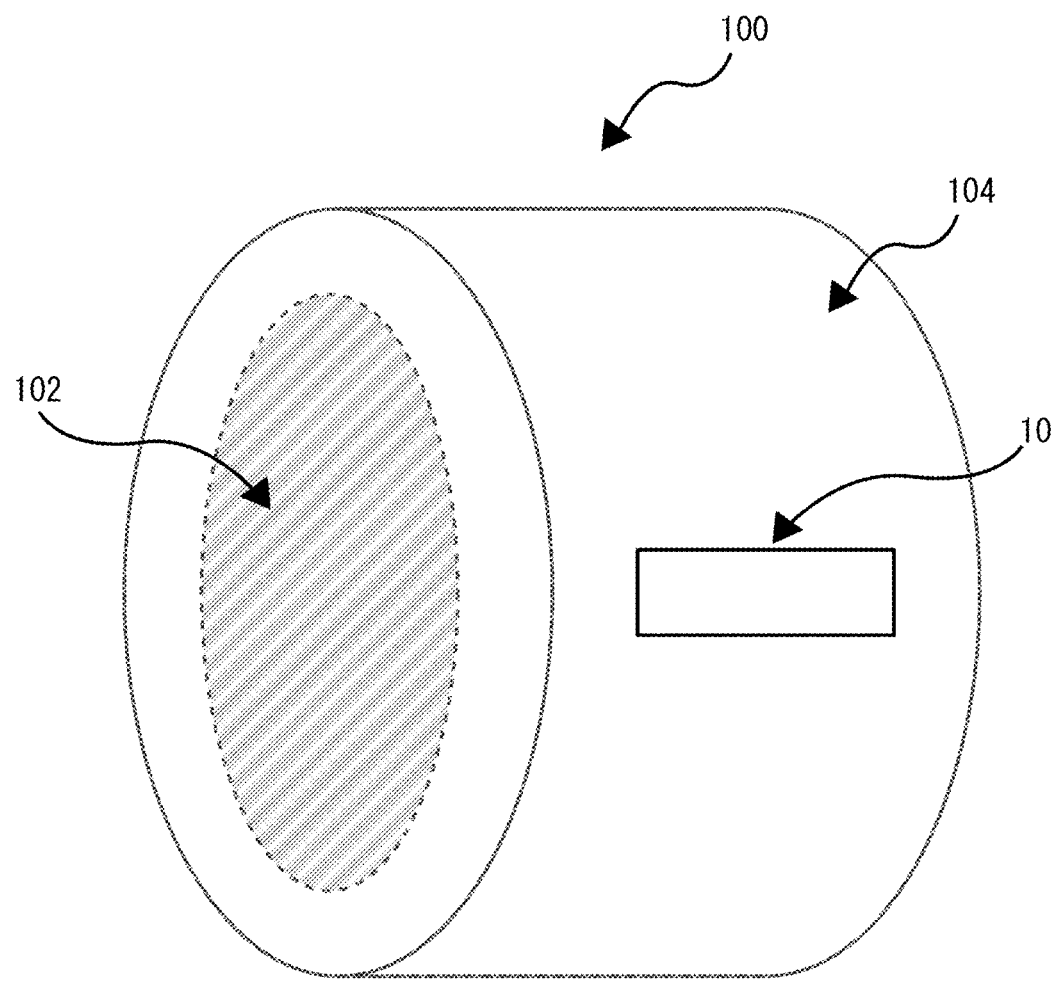
FIG. 10A is a diagram showing a first attachment example of the sensor device to a speed reducer.
Figure 10B:
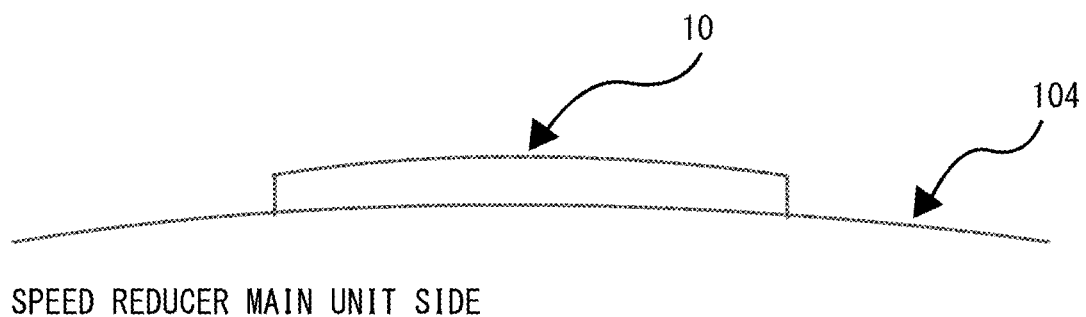
FIG. 10B is a diagram showing the first attachment example of the sensor device to the speed reducer.

FIG. 10A and FIG. 10B show a first attachment example of a sensor device 10 to a speed reducer 100. As shown in FIG. 10A, the speed reducer 100 includes a speed reduction mechanism 102, a casing 104 for housing the speed reduction mechanism 102, and a sensor device 10. As shown in FIG. 10B, the sensor device 10 is attached so as to adhere to the surface of the casing 104.

Figure 10C:
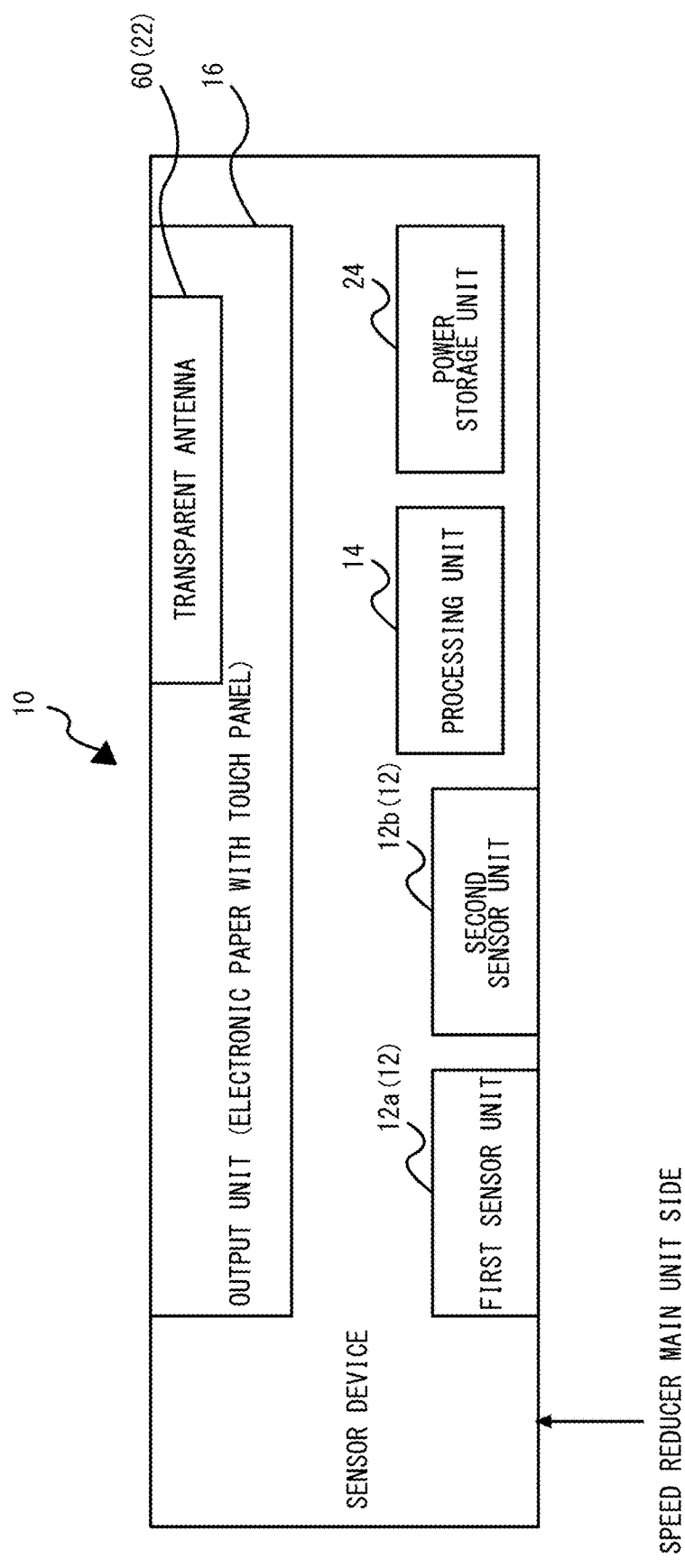
FIG. 10C is a diagram showing an example of functional blocks of the sensor device of FIG. 10A and FIG. 10B.

FIG. 10C shows an example of functional blocks of the sensor device 10 of FIG. 10A and FIG. 10B. The sensor device 10 includes a first sensor 12a and a second sensor 12b as a plurality of sensors. The first sensor 12a and the second sensor 12b are sensors that detect different types of physical quantities. The first sensor 12a may detect any one of temperature, humidity, sound, ultrasonic waves, distortion, atmospheric pressure, illuminance, GPS signals, BLE beacons, submersion degree, and wind power. Further, the second sensor 12b may detect a physical quantity of a type different from that by the first sensor 12a among the plurality of types of physical quantities.

The first sensor 12a and the second sensor 12b are arranged on the main unit side of the speed reducer 100, in other words, on the casing 104 side and detect the condition related to the casing. For example, the first sensor 12a may be a vibration sensor that detects the vibration of the casing 104 of the speed reducer 100. The second sensor 12b may be a temperature sensor that detects the temperature of the casing 104 of the speed reducer 100. The power storage unit 24 may be a capacitor (including an electric double layer capacitor). A transparent antenna 60 may be used as an energy harvesting unit 22 that generates electricity based on Wi-Fi radio waves.

The processing unit 14 may derive the condition of the casing 104 based on a detection signal output from the first sensor 12a and a detection signal output from the second sensor 12b and further estimate the condition of the speed reduction mechanism 102 from the condition of the casing 104. For example, the processing unit 14 may derive the vibration and temperature of the casing 104 based on a detection signal output from the vibration sensor and a detection signal output from the temperature sensor and further estimate the vibration and temperature of the speed reduction mechanism 102 from the vibration and temperature of the casing 104. The processing unit 14 may generate output information obtained by aggregating the estimation results in chronological order and display the output information on the output unit 16 arranged on the outer surface side (for example, the front surface side of the nomenclature plate).

Figure 11A:
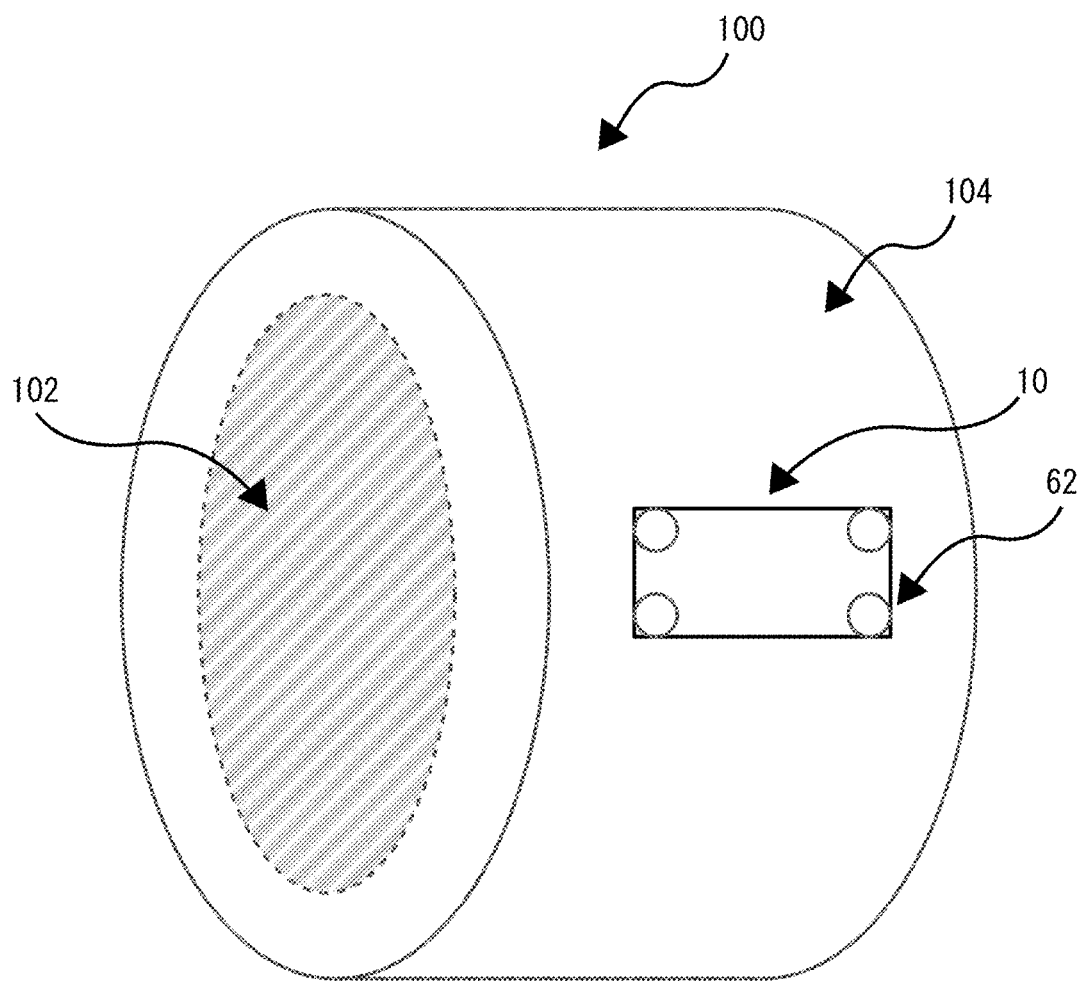
FIG. 11A is a diagram showing the first attachment example of the sensor device to the speed reducer.
Figure 11B:
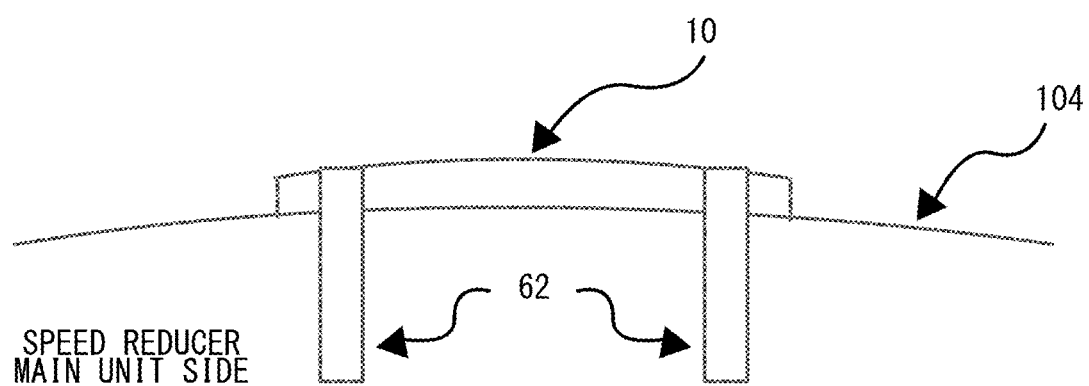
FIG. 11B is a diagram showing the first attachment example of the sensor device to the speed reducer.

FIG. 11A and FIG. 11B show a second attachment example of a sensor device 10 to a speed reducer 100. The sensor device 10 in the figures includes a fastening part 62, and the sensor device 10 is fixed to the surface of the casing 104 by inserting the fastening part 62 into the casing 104. The fastening part 62 may be a screw, a pin, or a rivet and may be, for example, a metal screw. The housing of the sensor device 10 is desirably made of a flexible material (for example, a thin metal plate or the like) so as to be in close contact with the casing 104.

FIG. 11C shows an example of functional blocks of the sensor device 10 of FIG. 11A and FIG. 11B. The sensor device 10 includes an ultrasonic sensor 66a and an ultrasonic sensor 66b as a plurality of sensors. The ultrasonic sensor 66a and the ultrasonic sensor 66b are connected to the fastening part 62, in other words, are arranged so as to be in contact with the fastening part 62. Thereby, the fastening part 62 also functions as a probe for accurately detecting the condition inside the main unit of the speed reducer 100. In this way, by providing a plurality of sensors (the ultrasonic sensor 66*a* and the ultrasonic sensor 66*b* in this case) that detect the same type of physical quantity at positions away from each other, it is possible to estimate the location where an abnormality has occurred by using triangulation.

A plurality of ultrasonic sensors may be used instead of the plurality of ultrasonic sensors. Further, a strain gauge may be used along with the ultrasonic sensors or instead of the ultrasonic sensors. By arranging the sensor device 10 on the curved surface of the casing 104, the amount of strain is increased, and the strain inside the main unit of the speed reducer 100 can be detected with high accuracy.

The power storage unit 24 may be a capacitor (including an electric double layer capacitor). A photovoltaic cell 64 (in other words, a solar cell) may be used as an energy harvesting unit 22 that generates electric power based on light from lighting or the like. The processing unit 14 may use the principle of triangulation based on a detection signal output from the ultrasonic sensor 66*a* and a detection signal output from the ultrasonic sensor 66*b* so as to generate output information that indicates the location of an abnormality inside the main unit of the speed reducer 100.

Figure 12:
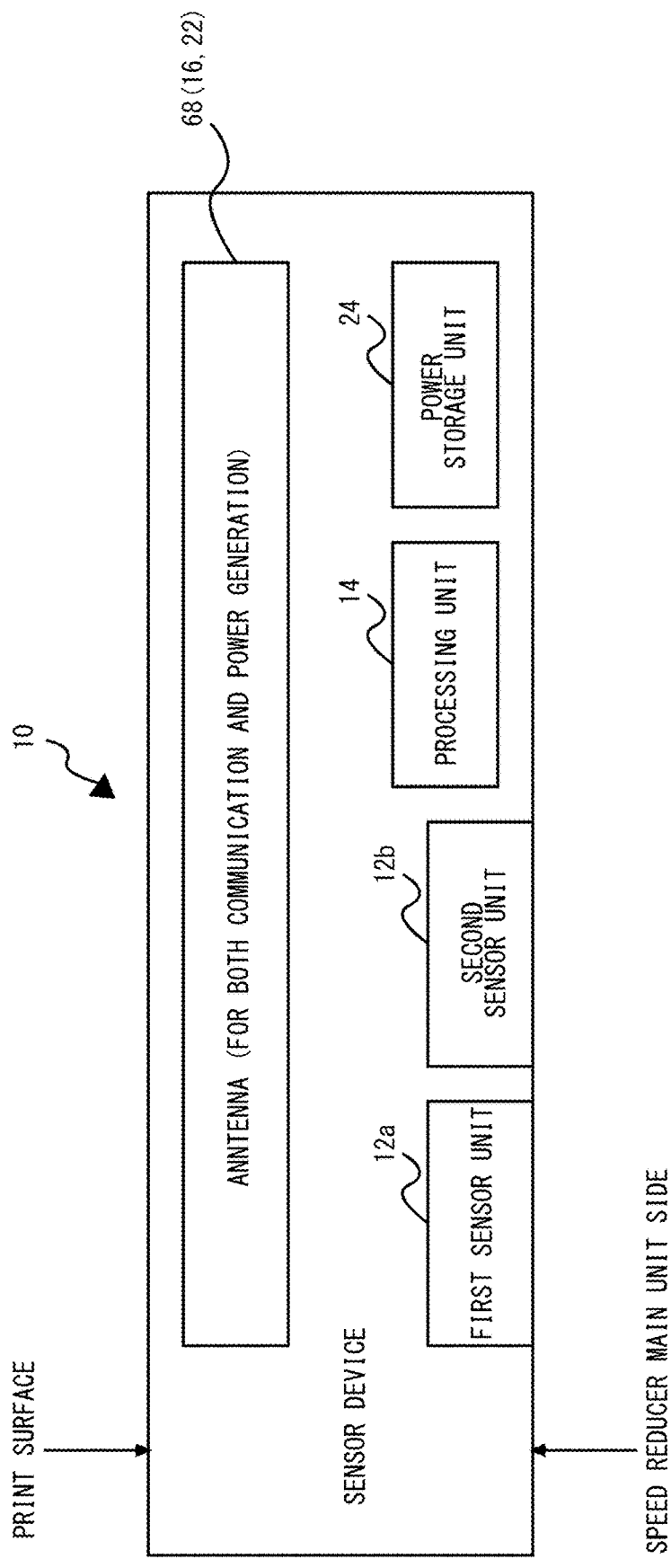
FIG. 12 is a diagram showing another example of the functional blocks of the sensor device of FIG. 10A and FIG. 10B.

FIG. 12 shows another example of functional blocks of the sensor device 10 of FIG. 10A and FIG. 10B. Differences from the sensor device 10 of FIG. 10C will be described here. The sensor device 10 in this figure includes an antenna 68 (that is, a communication unit) instead of electronic paper (that is, a display unit) as an output unit 16. The output unit 16 transmits a signal including output information generated by the processing unit 14 to an external device. Further, as an energy harvesting unit 22, the antenna 68 also has a function of generating electricity by Wi-Fi radio waves or NFC and supplying electric power to each unit. A print surface of the sensor device 10 is a surface that can be visually recognized from the outside. Items to be listed on a nomenclature plate are printed on the print surface, and for example, the manufacturer name, the speed reducer model number, the date of manufacture, and the like are printed.

Figure 13:
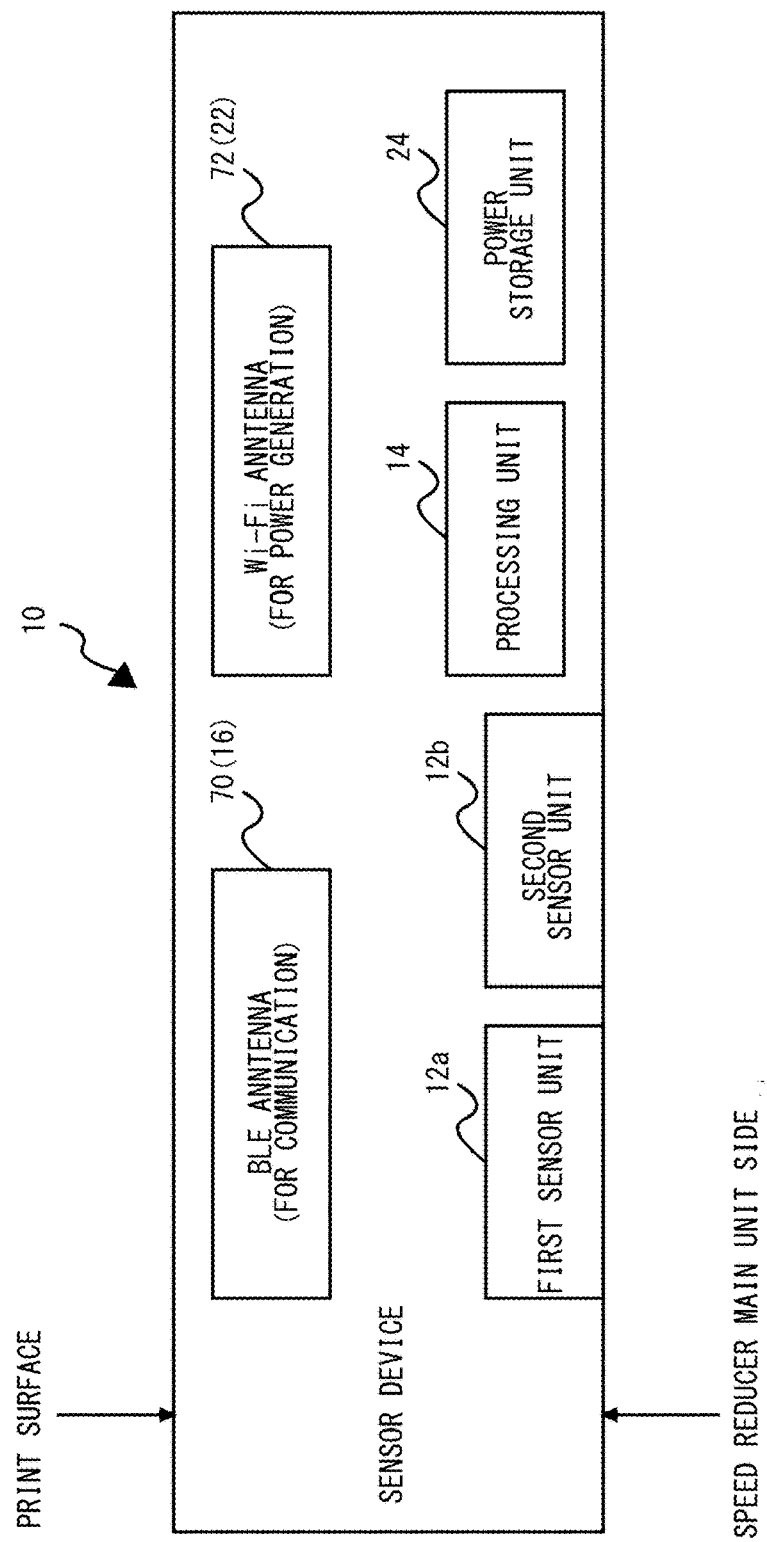
FIG. 13 is a diagram showing another example of the functional blocks of the sensor device of FIG. 10A and FIG. 10B.

FIG. 13 also shows another example of the functional blocks of the sensor device 10 of FIG. 10A and FIG. 10B. The sensor device 10 in the figure is different from the sensor device 10 in FIG. 12 in that the sensor device 10 in the figure includes a plurality of types of antennas. A Wi-Fi antenna 72 generates electricity based on Wi-Fi radio waves as an energy harvesting unit 22. On the other hand, a BLE antenna 70 communicates with an external device as an output unit 16. By generating electric power using Wi-Fi with relatively large reception power, and transmitting and receiving electricity using a power-saving BLE, the efficiency of power generation and power consumption can be improved.

Figure 14:
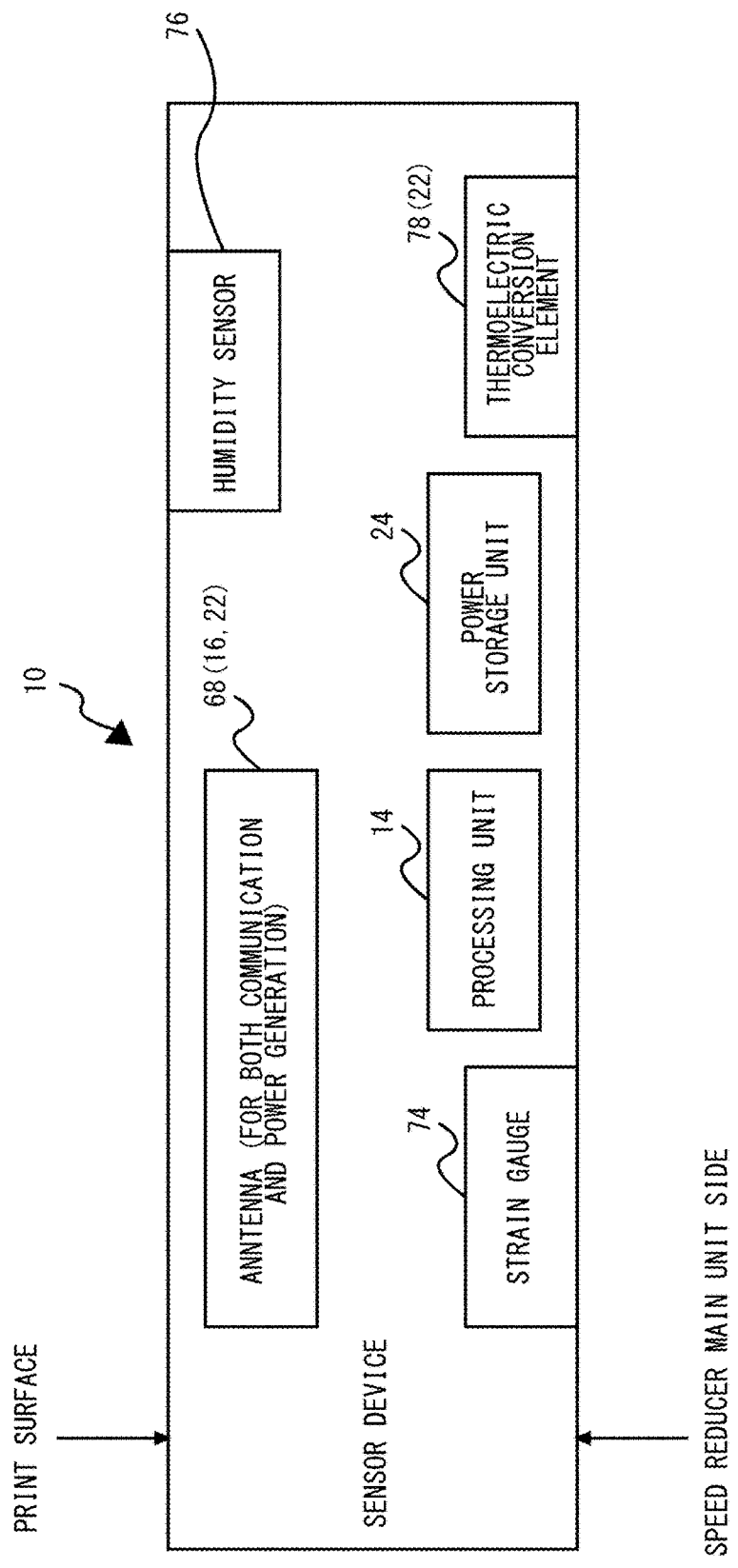
FIG. 14 is a diagram showing another example of the functional blocks of the sensor device of FIG. 10A and FIG. 10B.

FIG. 14 also shows another example of the functional blocks of the sensor device 10 of FIG. 10A and FIG. 10B. In the same way as in the sensor device 10 of FIG. 12, the antenna 68 functions not only as a communication unit but also as a first power generation unit. A thermoelectric conversion element 78 is an element that converts heat energy conducted from the inside of the speed reducer 100 into electric energy by utilizing the Seebeck effect, the Pertier effect, or the Thomson effect and functions as a second power generation unit. A humidity sensor 76 is provided on the outer surface side (that is, the print surface side) of the sensor device 10 and detects the humidity around the speed reducer 100.

A strain gauge 74 dynamically measures the deformation of the main unit of the speed reducer 100 (casing 104). Therefore, at least a portion of the housing of the sensor device 10 where the strain gauge is arranged is desirably made of a stretchable material (can be also considered as a stretchable material, for example, a resin film or the like). Further, as shown in FIG. 10B, the sensor device 10 of FIG. 14 is fixed to the casing 104 of the speed reducer 100 by adhesion.

The strain gauge 74 also functions as a touch sensor for detecting stress generated by the touching or the like of the outer surface (print surface) of the sensor device 10 by the operator. When the strain gauge 74 detects a stress of a predetermined magnitude and direction, the processing unit 14 may determine that an output instruction for detection information has been input. The processing unit 14 may generate output information based on the humidity detected by the humidity sensor 76 and the strain detected by the strain gauge 74 and transmit the output information to an external device via the antenna 68.

Figure 15:
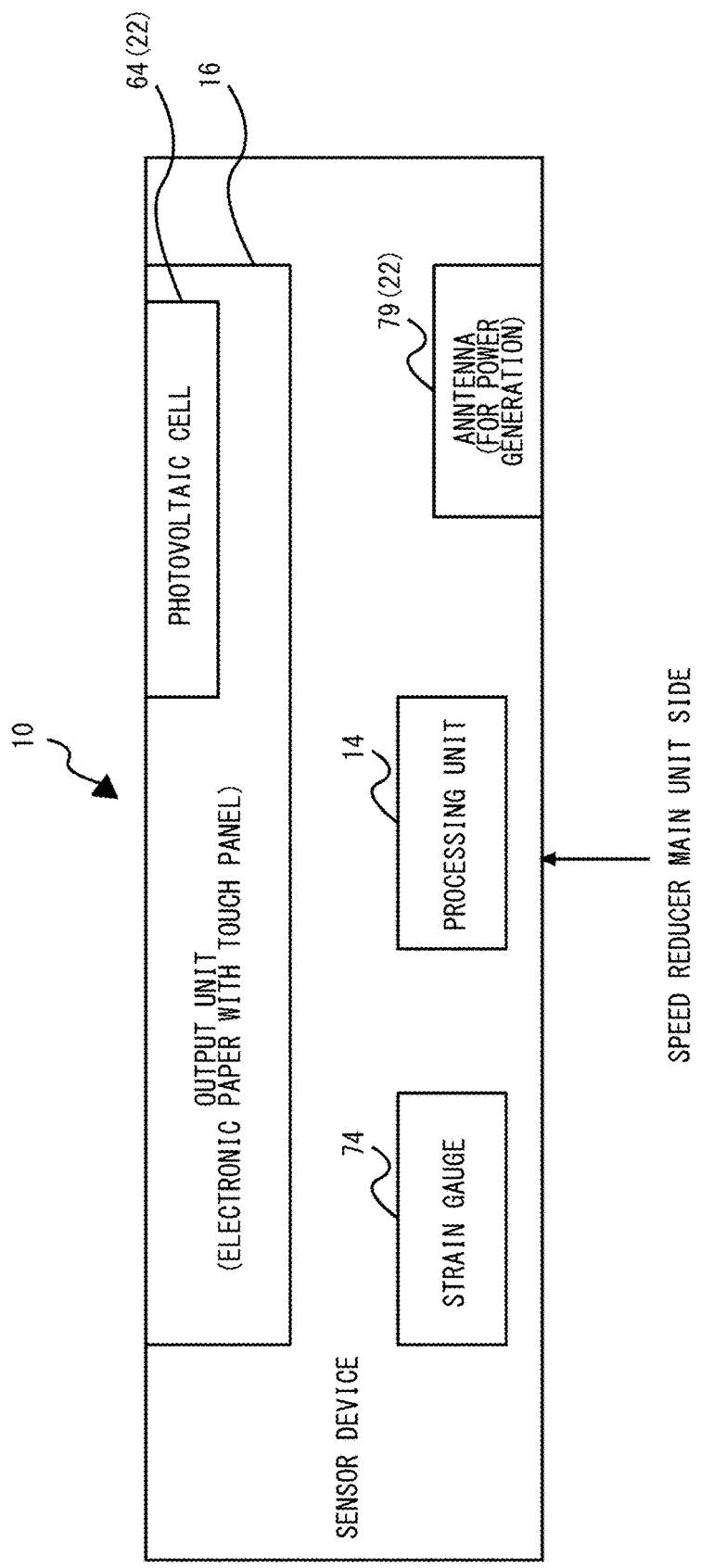
FIG. 15 is a diagram showing another example of the functional blocks of the sensor device of FIG. 10A and FIG. 10B.

FIG. 15 also shows another example of the functional blocks of the sensor device 10 of FIG. 10A and FIG. 10B. The photovoltaic cell 64 converts light energy of lighting or the like into electrical energy as a first power generation unit. As a second power generation unit, the antenna 79 receives electromagnetic noise propagated from the main unit side of the speed reducer 100 so as to generate power. Temperature difference power generation may be performed by using the thermoelectric conversion element 78 instead of the antenna 79. As a secondary effect of providing the antenna 79, the sensor device 10 can be used as an electromagnetic shield since the antenna 79 absorbs electromagnetic noise.

As shown in FIGS. 14 and 15, by providing a plurality of power generation units of different methods, the required electric power can be easily fulfilled as a whole even when the power generation amount of one of the power generation units becomes insufficient. Further, since the sensor device 10 of FIG. 15 is not provided with the power storage unit 24 (capacitor or the like), the sensor device 10 can be miniaturized.

Figure 16:
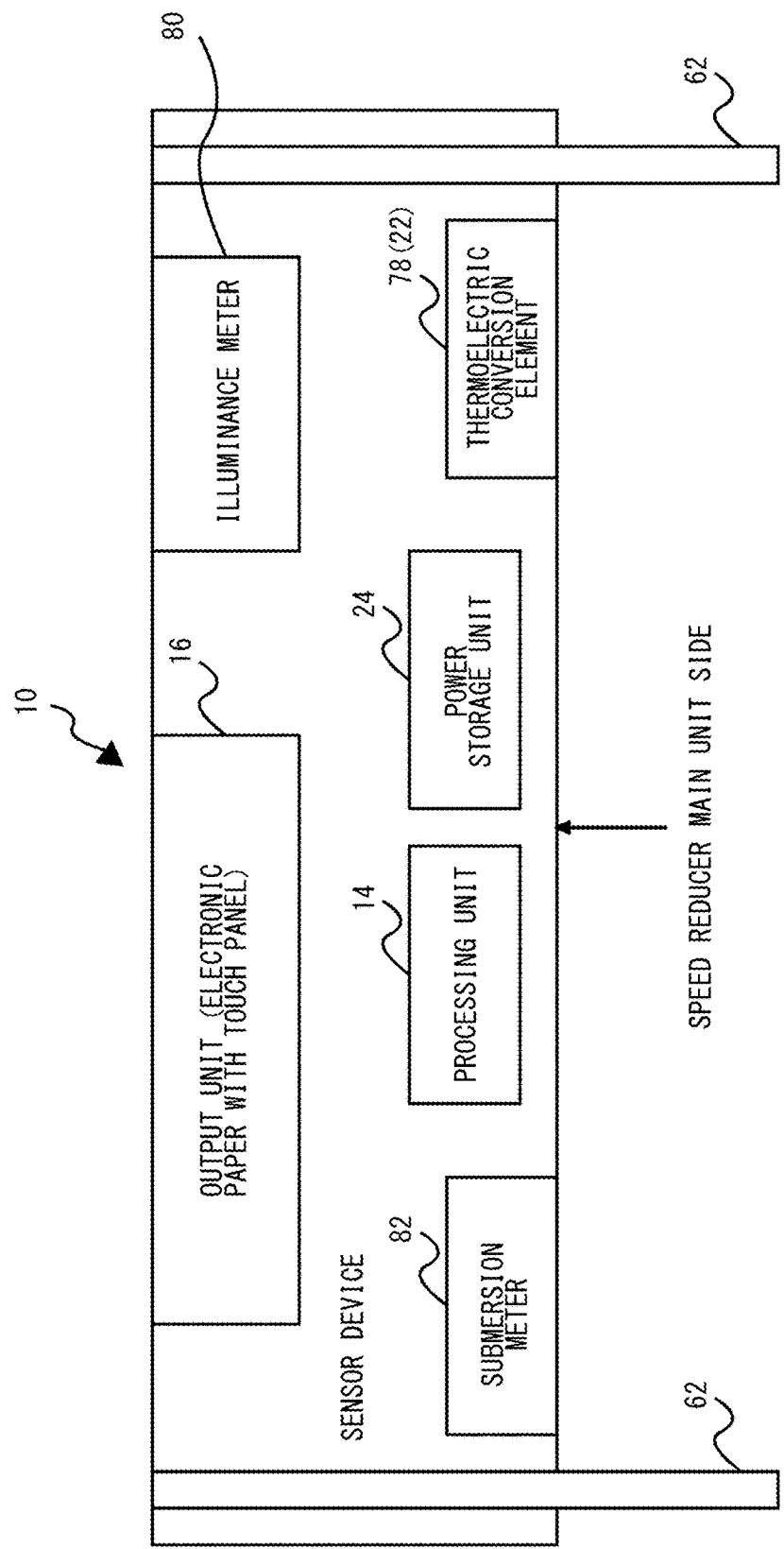
FIG. 16 is a diagram showing another example of the functional blocks of the sensor device of FIG. 11A and FIG. 11B.

FIG. 16 shows another example of functional blocks of the sensor device 10 of FIG. 11A and FIG. 11B. A submersion meter 82 is a sensor that detects the degree of submersion (presence or absence of submersion). By providing the submersion meter 82, whether or not the main unit of the speed reducer 100 has been submerged can be checked. For example, when a plurality of speed reducers 100 are attached in a vertical direction to one robot, how high the robot has been submerged can be grasped by aggregating output information from the plurality of sensor devices 10 mounted on the plurality of speed reducers 100.

An illuminance meter 80 is provided on the outer surface (outside side) of the speed reducer 100 and detects the illuminance around the speed reducer 100. By including the illuminance around the speed reducer 100 based on the detection result from the illuminance meter 80 in the output information, whether or not a worker (inspection worker or the like) having a portable electric lamp has come nearby can be grasped. Further, whether or not the lighting near the speed reducer 100 is turned off can be grasped.

Figure 17A:
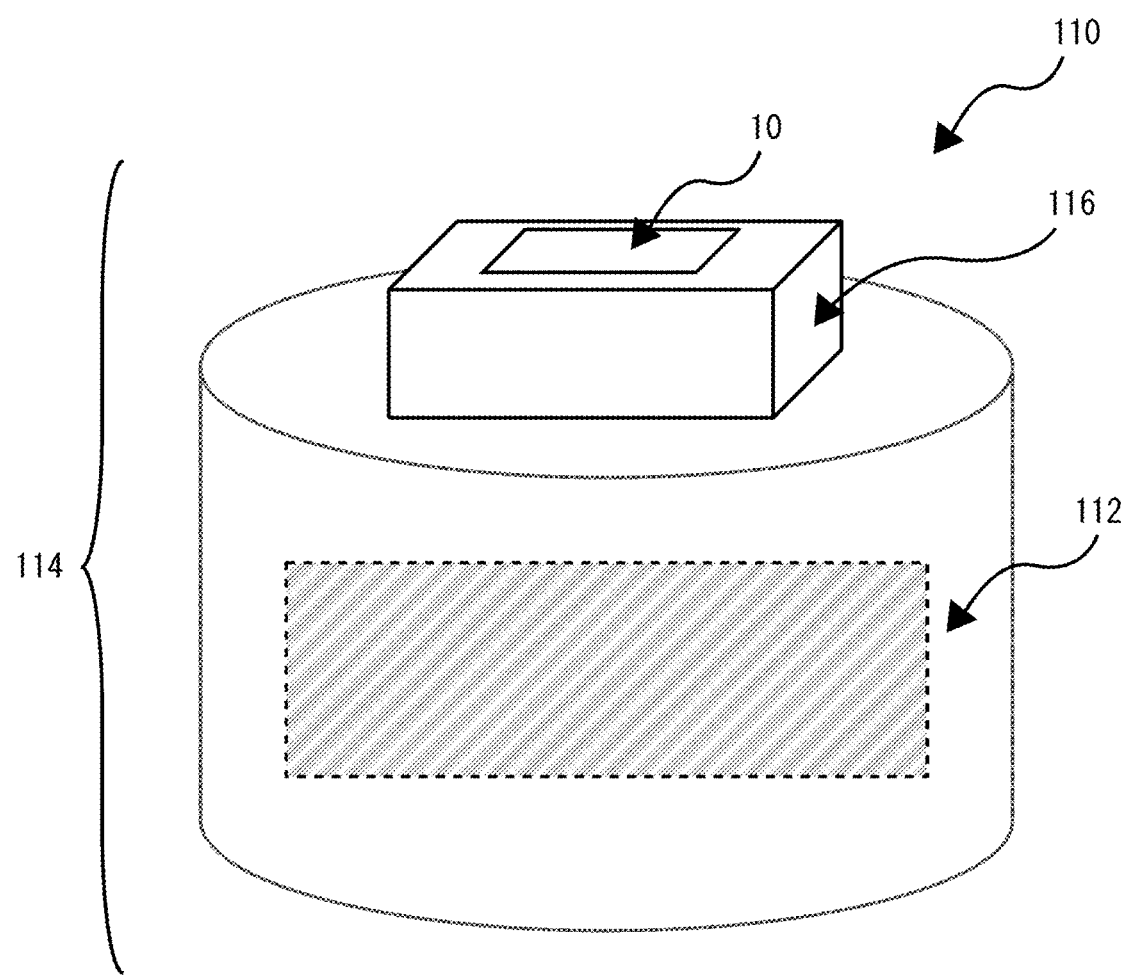
FIG. 17A is a diagram showing an attachment example of the sensor device to a traveling unit for a crawler.
Figure 17B:
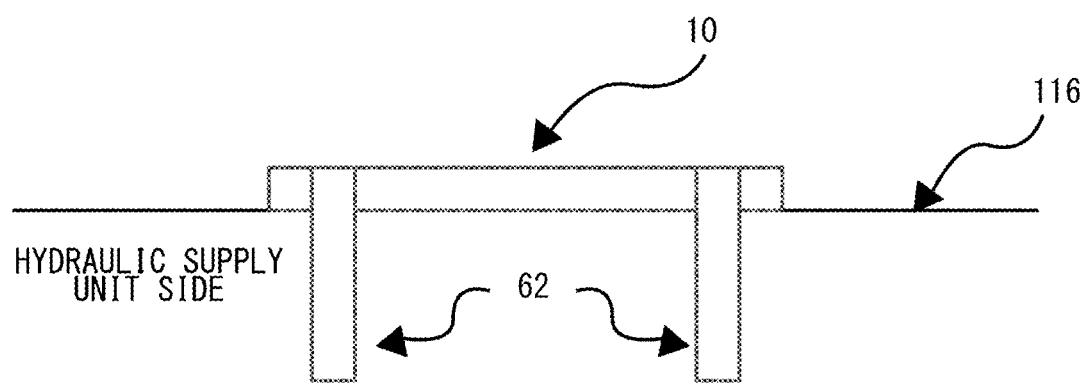
FIG. 17B is a diagram showing an attachment example of the sensor device to the traveling unit for a crawler.

FIG. 17A and FIG. 17B show an attachment example of the sensor device 10 to a traveling unit 110 for a crawler. As shown in FIG. 17A, the traveling unit 110 for a crawler includes a traveling control unit 112 that controls the operation of the crawler, a casing 114 that houses the traveling control unit 112, and a sensor device 10. The casing 114 includes a hydraulic supply unit 116. As shown in FIG. 17B, the sensor device 10 includes a fastening part 62. The sensor device 10 is fixed to the surface of the casing 114 (the hydraulic supply unit 116 in this case) by inserting the fastening part 62 into the casing 114 (the hydraulic supply unit 116 in this case).

Figure 17C:
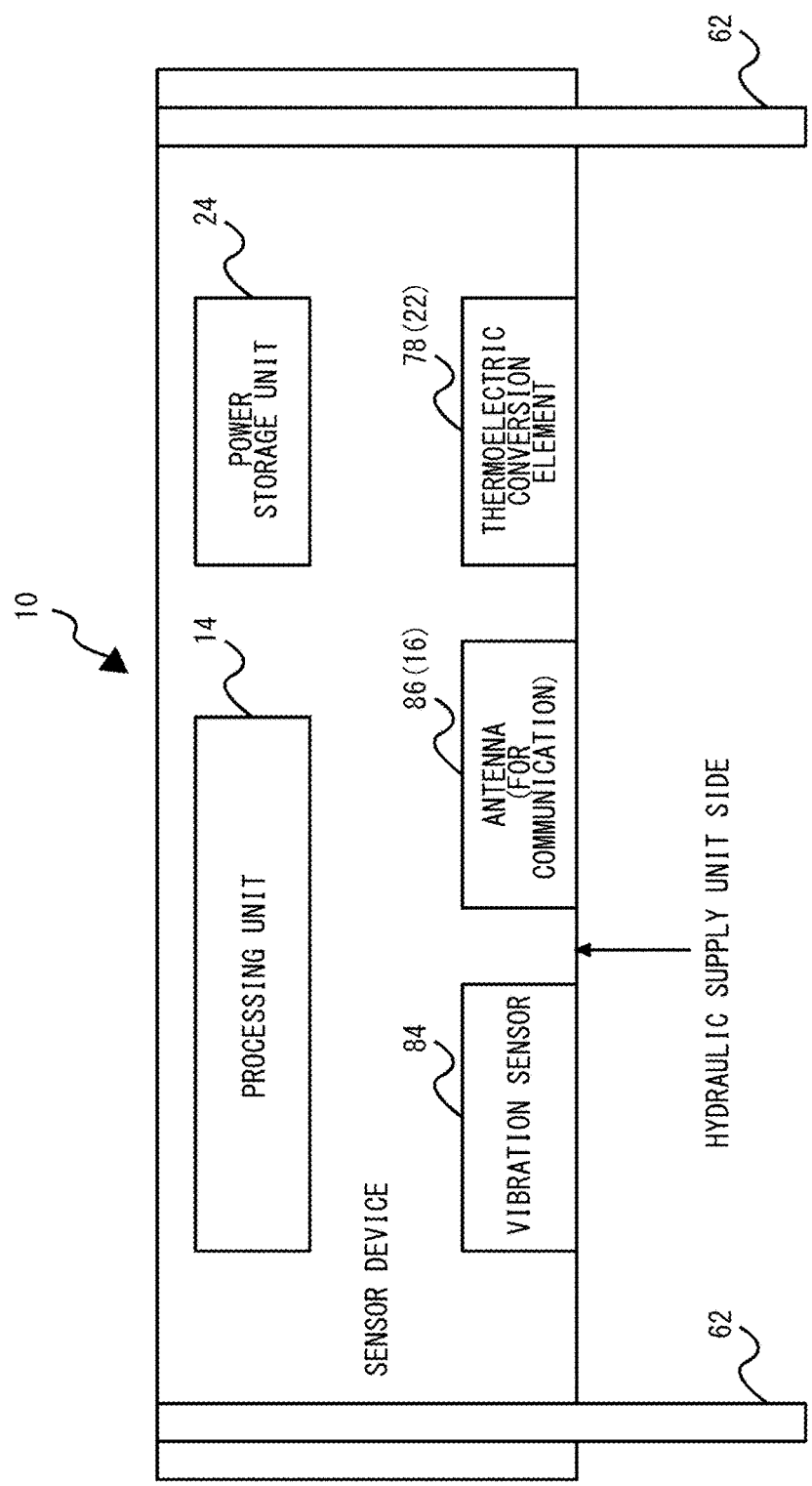
FIG. 17C is a diagram showing an example of functional blocks of the sensor device of FIG. 17A and FIG. 17B.

FIG. 17C shows an example of functional blocks of the sensor device 10 of FIG. 17A and FIG. 17B. The thermoelectric conversion element 78 generates electricity by utilizing the temperature of hydraulic oil as an energy harvesting unit 22. The power storage unit 24 is, for example, a capacitor. The antenna 86 functions as an output unit 16. The antenna 86 wirelessly communicates with an external device by using the housing (metal body) of the traveling unit 110 for a crawler as an antenna. As an exemplary variation, the sensor device 10 may communicate with an external device using known human body communication technology, handshake communication technology, or electric field communication technology.

The processing unit 14 may derive the vibration amount of the casing 114 (the hydraulic supply unit 116 in this case) based on the detection signal output from the vibration sensor 84 and further estimate from the vibration amount the vibration amount of the traveling control unit 112 or the crawler. The processing unit 14 may transmit the estimation result from the antenna 86 to the external device.

Figure 18A:
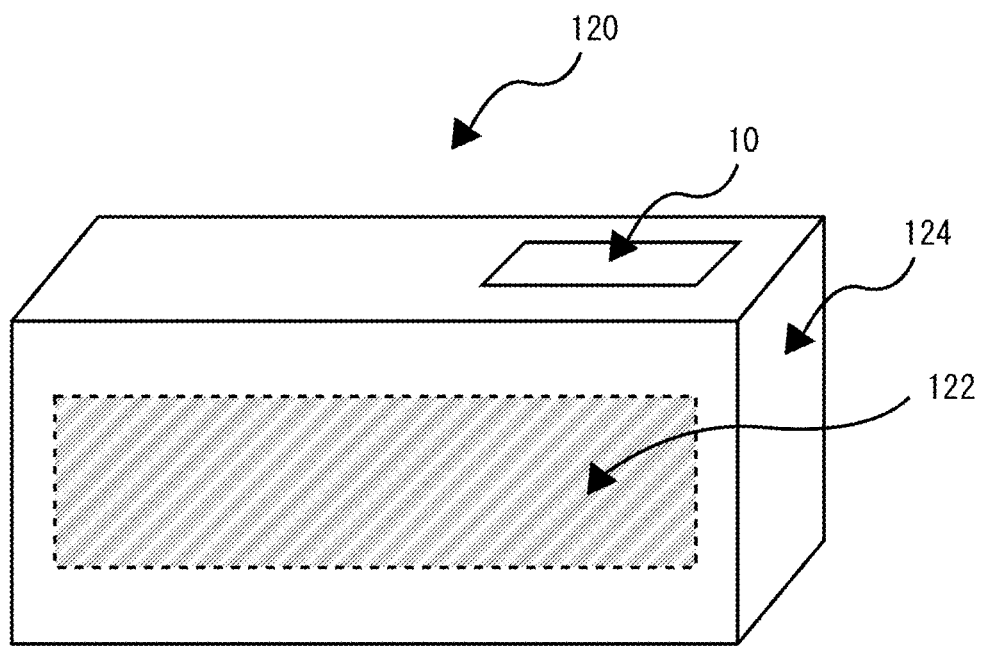
FIG. 18A is a diagram showing an attachment example of the sensor device to a hydraulic valve.
Figure 18B:
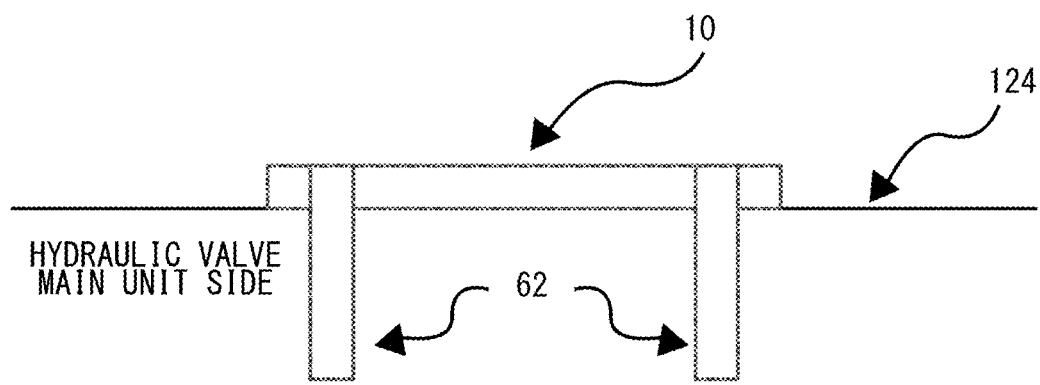
FIG. 18B is a diagram showing an attachment example of the sensor device to the hydraulic valve.

FIG. 18A and FIG. 18B show an attachment example of the sensor device 10 to a hydraulic valve 120. As shown in FIG. 18A, the hydraulic valve 120 includes a valve unit 122 that controls the flow of hydraulic oil (mineral oil or the like), a casing 124 that houses the valve unit 122, and a sensor device 10. As shown in FIG. 18B, the sensor device 10 includes a fastening part 62. The sensor device 10 is fixed to the surface of the casing 124 by inserting the fastening part 62 into the casing 124.

Figure 18C:
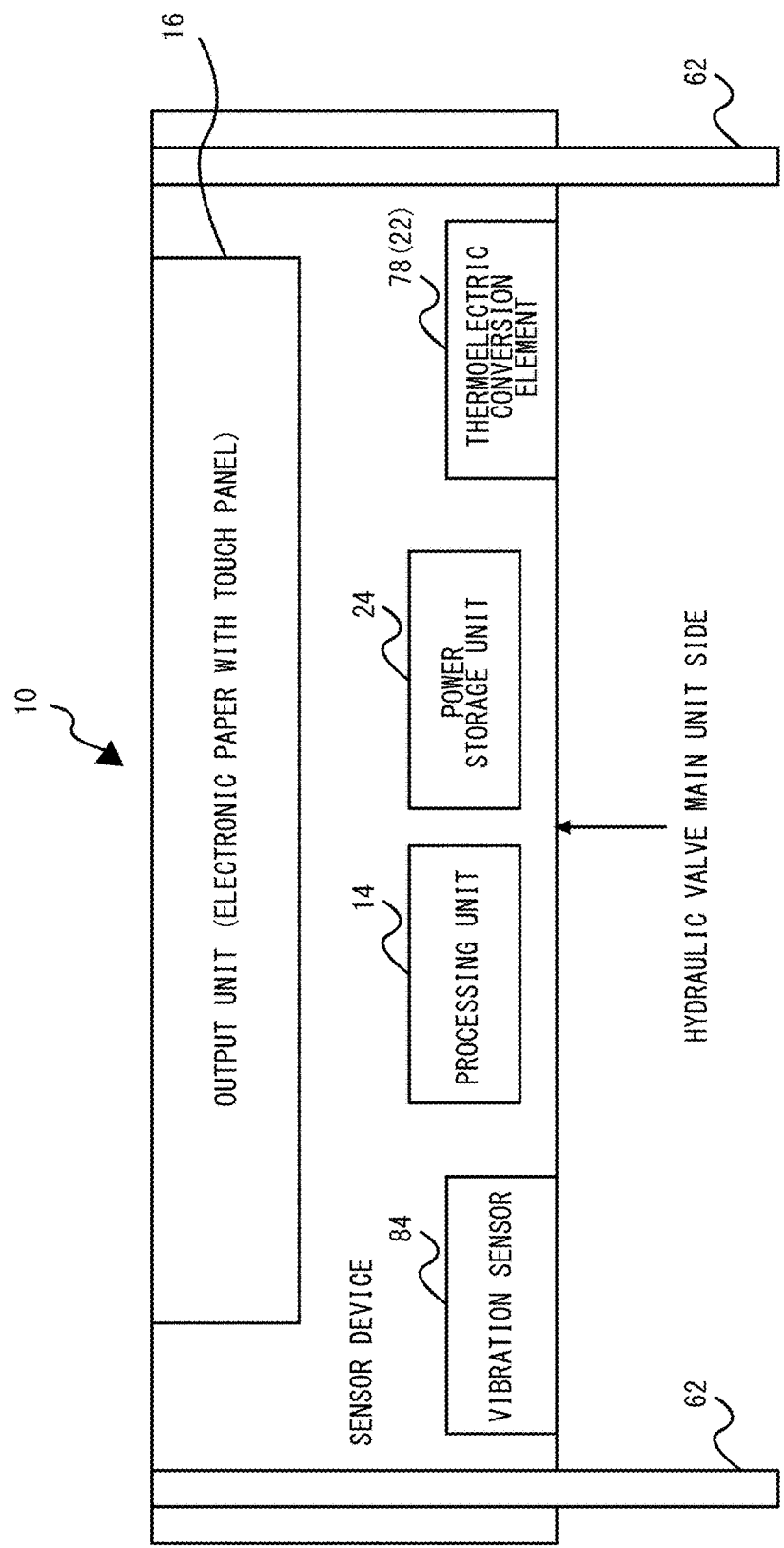
FIG. 18C is a diagram showing an example of functional blocks of the sensor device of FIG. 18A and FIG. 18B.

FIG. 18C shows an example of functional blocks of the sensor device 10 of FIG. 18A and FIG. 18B. The thermoelectric conversion element 78 generates electricity by utilizing the temperature of hydraulic oil as an energy harvesting unit 22. The power storage unit 24 is, for example, a capacitor. The sensor device 10 in this example includes electronic paper with a touch panel as an output unit 16. As in the case of the sensor device 10 of FIG. 17C, the housing (metal body) of the hydraulic valve 120 may be used as an antenna.

The processing unit 14 may derive the vibration amount of the casing 124 based on the detection signal output from the vibration sensor 84 and further estimate from the vibration amount the vibration amount of the valve unit 122. The processing unit 14 may display the estimation result on the electronic paper of the output unit 16. Needless to say, the sensor device 10 may be attached not only to the hydraulic valve 120 but also to various types of fluid valves (pneumatic valve, water pressure valve, etc.).

Figure 19A:
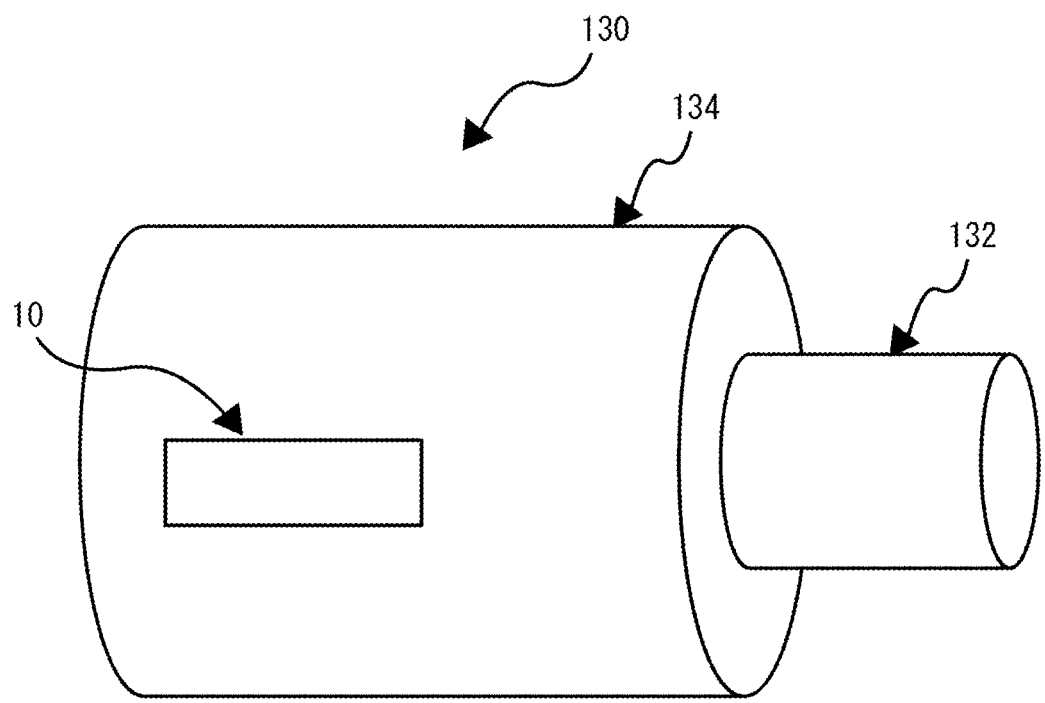
FIG. 19A is a diagram showing an attachment example of the sensor device to a pneumatic cylinder.
Figure 19B:
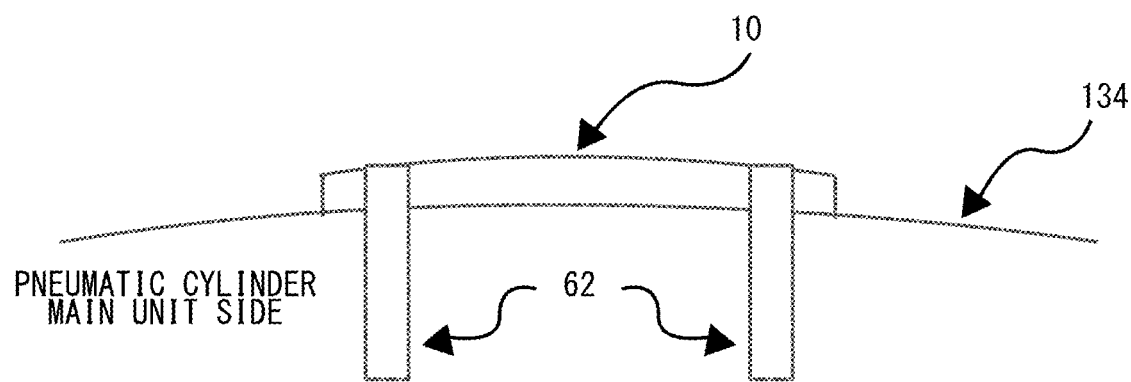
FIG. 19B is a diagram showing an attachment example of the sensor device to the pneumatic cylinder.

FIG. 19A and FIG. 19B show an attachment example of the sensor device 10 to a pneumatic cylinder 130. As shown in FIG. 19A, the pneumatic cylinder 130 includes a cylinder unit 132 for accommodating air, a casing 134 for accommodating the cylinder unit 132, and a sensor device 10. As shown in FIG. 19B, the sensor device 10 includes a fastening part 62. The sensor device 10 is fixed to the surface of the casing 134 by inserting the fastening part 62 into the casing 134.

Figure 19C:
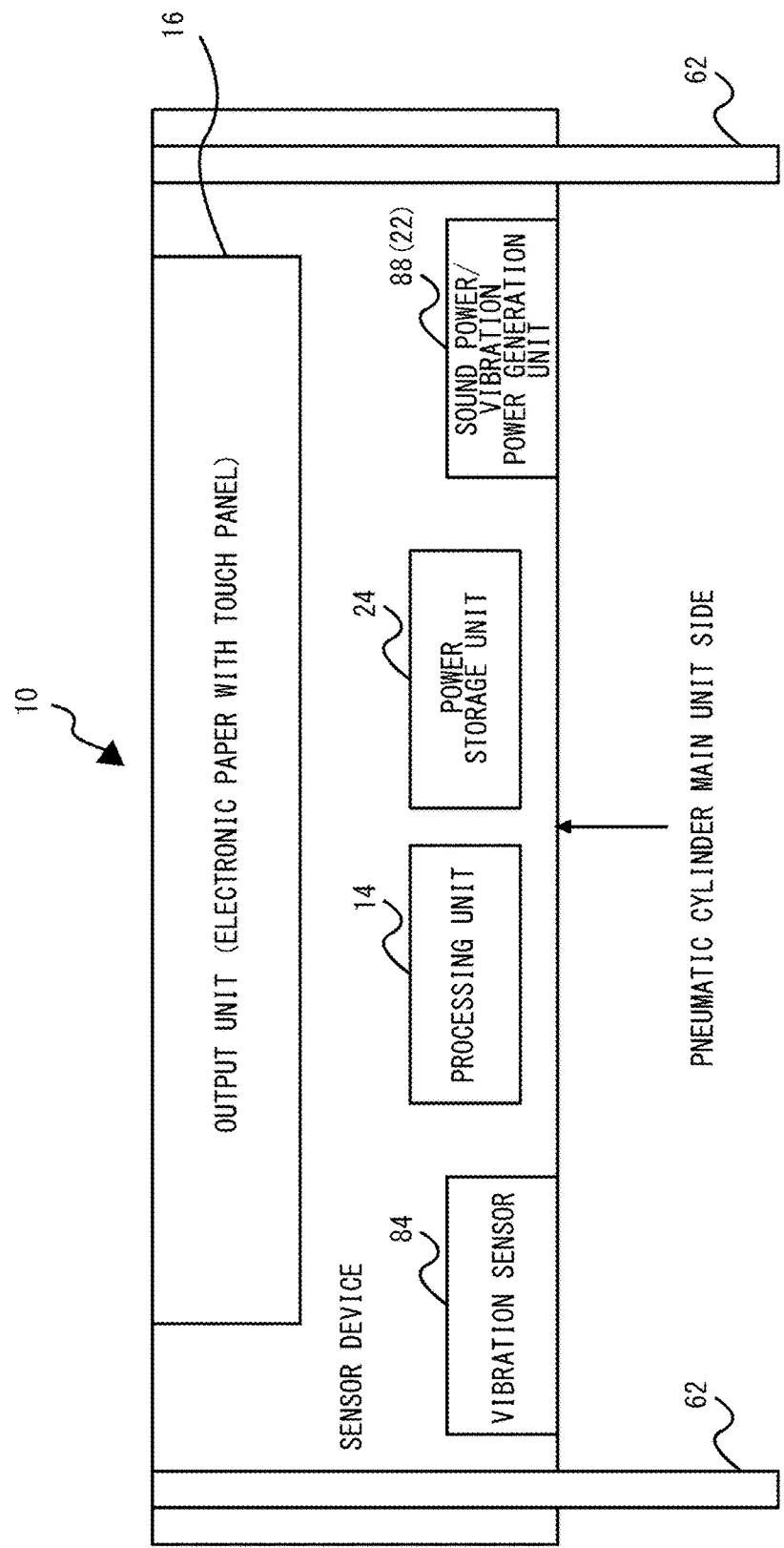
FIG. 19C is a diagram showing an example of functional blocks of the sensor device of FIG. 19A and FIG. 19B.

FIG. 19C shows an example of functional blocks of the sensor device 10 of FIG. 19A and FIG. 19B. As an energy harvesting unit 22, a sound power/vibration power generation unit 88 converts the energy of the exhaust sound or vibration of compressed air in the cylinder unit 132 into electrical energy. The power storage unit 24 is a secondary battery such as a lithium ion battery, a solid lithium ion battery, or an air battery in this case. The sensor device 10 in this example includes electronic paper with a touch panel as an output unit 16. As in the case of the sensor device 10 of FIG. 17C, the housing (metal body) of the pneumatic cylinder 130 may be used as an antenna.

The processing unit 14 may derive the vibration amount of the casing 134 based on the detection signal output from the vibration sensor 84 and further estimate from the vibration amount the vibration amount of the cylinder unit 132. The processing unit 14 may display the estimation result on the electronic paper of the output unit 16. Needless to say, the sensor device 10 may be attached not only to the pneumatic cylinder 130 but also to various types of fluid cylinders (hydraulic cylinder, water pressure cylinder, mechanical cylinder, etc.).

Figure 20:
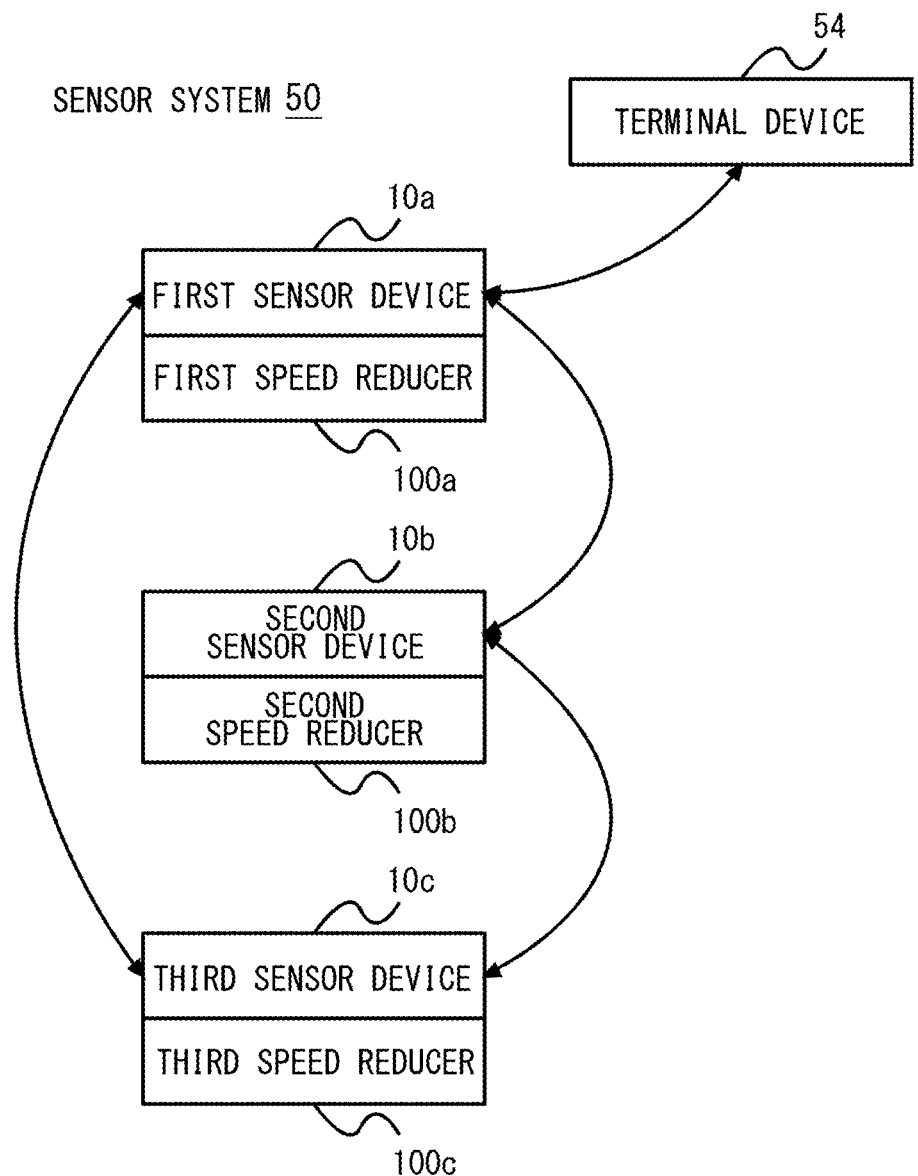
FIG. 20 is a diagram showing an example of cooperation between a plurality of sensor devices.

Next, an example of a sensor system including a plurality of sensor devices 10 will be described. FIG. 20 shows an example of cooperation (in other words, collaboration) of the plurality of sensor devices 10. In the example in FIG. 20, one sensor device 10 is attached to one speed reducer. More specifically, a first sensor device 10a is attached to a first speed reducer 100a, a second sensor device 10b is attached to a second speed reducer 100b, and a third sensor device 10c is attached to a third speed reducer 100c. The respective output units 16 of the first sensor device 10a, the second sensor device 10b, and the third sensor device 10c include a communication unit that uses Wi-Fi or the like. The first sensor device 10a, the second sensor device 10b, and the third sensor device 10c are formed to be communicable with one another.

For example, when the communication unit of the first sensor device 10a receives an information provision request from the terminal device 54, the communication unit may transmit the information provision request to the second sensor device 10b and the third sensor device 10c. The communication unit of the second sensor device 10b may transmit output information (for example, temperature information of the second speed reducer 100b) generated by the processing unit 14 to the first sensor device 10a. The communication unit of the third sensor device 10c may transmit output information (for example, temperature information of the third speed reducer 100c) generated by the processing unit 14 to the first sensor device 10a. The communication unit of the first sensor device 10a may transmit output information generated by the own device (for example, temperature information of the first speed reducer 100a), output information transmitted from the second sensor device 10b, and output information transmitted from the third sensor device 10c collectively to the terminal device 54. According to this aspect, if the terminal device 54 makes a request to one sensor device 10, the terminal device 54 can acquire a plurality of pieces of output information indicating conditions related to the plurality of speed reducers 100 generated by the plurality of sensor devices 10.

Figure 21:
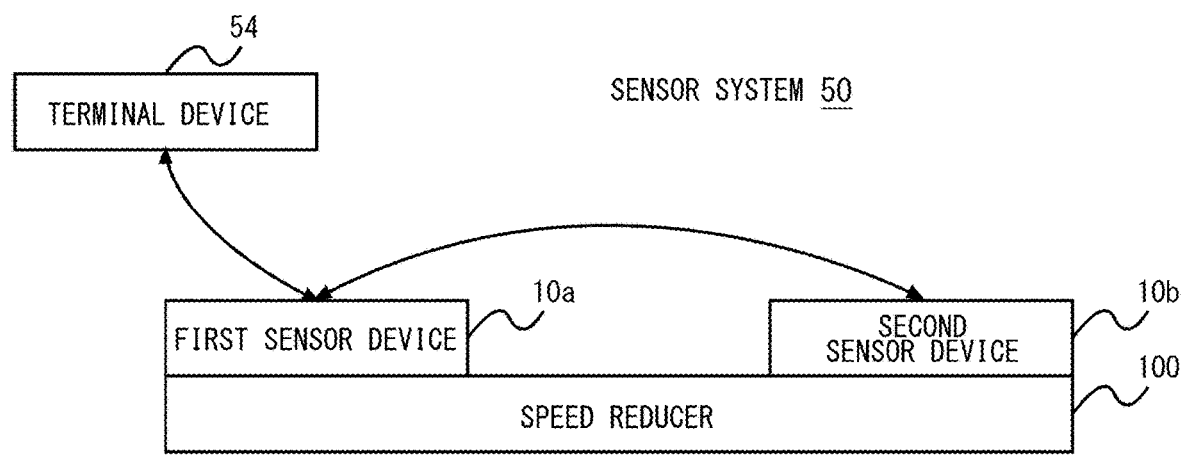
FIG. 21 is a diagram showing an example of cooperation between the plurality of sensor devices.

FIG. 21 also shows an example of cooperation of a plurality of sensor devices 10. In the example of FIG. 21, a plurality of sensor devices 10 (in this example, the first sensor device 10a and the second sensor device 10b) are attached to one speed reducer 100. The output unit 16 of the first sensor device 10a and the output unit 16 of the second sensor device 10b include a communication unit that uses Wi-Fi or the like. The first sensor device 10a and the second sensor device 10b are formed to be communicable with each other.

For example, when the communication unit of the first sensor device 10*a* receives an information provision request from the terminal device 54, the communication unit may transmit the information provision request to the second sensor device 10*b*. The communication unit of the second sensor device 10*b* may transmit output information (for example, temperature information and/or vibration information of the second portion of the speed reducer 100) generated by the processing unit 14 to the first sensor device 10*a*. The communication unit of the first sensor device 10*a* may transmit the output information generated by the own device (for example, the temperature information and/or vibration information of the first portion of the speed reducer 100) and the output information transmitted from the second sensor device 10*b* collectively to the terminal device 54. According to this aspect, if terminal device 54 makes a request to one sensor device 10, the terminal device 54 can acquire a plurality of pieces of output information indicating conditions related to a plurality of locations of one speed reducer 100 generated by the plurality of sensor devices 10. For example, according to the vibration amount detected at a plurality of locations of one speed reducer 100, the terminal device 54 can identify abnormal locations in the speed reducer 100 by using the principle of triangulation.

Described above is an explanation made based on an exemplary embodiment. The exemplary embodiment is intended to be illustrative only, and it will be obvious to those skilled in the art that various modifications to constituting elements and processes described in the exemplary embodiment could be developed and that such modifications are also within the scope of the present invention.

An exemplary variation will be described. A sensor device 10 can be attached to various articles not mentioned in the above exemplary embodiment. For example, the sensor device 10 may be attached as a nomenclature plate of a fluid pump (hydraulic pump, water pressure pump, air pump, etc.). This fluid pump may include a pump unit that controls the flow of fluid, a casing that houses the pump unit, and a sensor device 10. The sensor device 10 may be attached to the casing. The sensor device 10 may estimate the condition related to the pump unit (for example, temperature, vibration, etc.) by detecting the condition related to the casing and output output information indicating the estimation result to the outside.

Further, for example, the sensor device 10 may be attached as a nomenclature plate of a fluid compressor (air compressor, gas compressor, etc.). This fluid compressor may include a compression unit that applies pressure to the fluid, a casing that houses the compression unit, and a sensor device 10. The sensor device 10 may be attached to the casing. The sensor device 10 may estimate the condition related to the compression unit (for example, temperature, vibration, etc.) by detecting the condition related to the casing and output output information indicating the estimation result to the outside.

Further, for example, the sensor device 10 may be attached as a nomenclature plate of an electric motor. The electric motor may include a motor unit that converts electrical energy into mechanical energy, a casing that houses the motor unit, and a sensor device 10. The sensor device 10 may be attached to the casing. The sensor device 10 may estimate the condition related to the motor unit (for example, temperature, vibration, etc.) by detecting the condition related to the casing and output output information indicating the estimation result to the outside.

Further, for example, the sensor device 10 may be attached as a nomenclature plate of an electric actuator. This electric actuator may include a drive unit that converts electrical energy into mechanical energy, a casing that houses the drive unit, and a sensor device 10. The sensor device 10 may be attached to the casing. The sensor device 10 may estimate the condition related to the drive unit (for example, temperature, vibration, etc.) by detecting the condition related to the casing and output output information indicating the estimation result to the outside.

Further, for example, the sensor device 10 may be attached as a nomenclature plate of furniture, in other words, furniture to which the sensor device 10 is attached may be realized. The sensor device 10 may be attached to the housing (outer surface) of the furniture. The sensor device 10 may detect the condition related to the furniture (the housing of the furniture) and output output information indicating the detection result to the outside.

Further, for example, the sensor device 10 may be attached as a nomenclature plate of a tray used for the delivery of an article, in other words, a tray to which the sensor device 10 is attached may be realized. By detecting the condition related to the tray, the sensor device 10 may estimate the condition related to the article being delivered in the tray and output output information indicating the estimation result to the outside.

Further, for example, the sensor device 10 may be attached to the packaging material of the article, in other words, the packaging material to which the sensor device 10 is attached may be realized. The sensor device 10 may be attached to the outer surface of the packaging material. By detecting the condition related to the packaging material, the sensor device 10 may estimate the condition related to the article packaged by the packaging material and output output information indicating the estimation result to the outside.

Further, for example, the sensor device 10 may be attached as a nomenclature plate of tableware, in other words, the tableware to which the sensor device 10 is attached may be realized. The sensor device 10 may detect the condition related to the tableware and output output information indicating the detection result to the outside.

Further, for example, the sensor device 10 may be attached as a nomenclature plate of a home electric appliance, in other words, a home electric appliance to which the sensor device 10 is attached may be realized. The sensor device 10 may be attached to the housing (outer surface) of a home electric appliance. The sensor device 10 may estimate the condition related to the device portion (for example, temperature, vibration, etc.) by detecting the condition related to the housing of the home electric appliance and output output information indicating the detection result to the outside.

The sensor device 10 may be attached as a nomenclature plate to various constructions having predetermined physical structures. In this case, the sensor unit 12 of the sensor device 10 measures various conditions related to the physical structure of a construction. The construction may be the furniture, the tray, the packaging material, the tableware, or the household appliance described above, as well as building materials, automobile parts, railroad vehicle parts, aircraft parts, ship parts, industrial robot parts, or construction machine parts.

Figure 22:
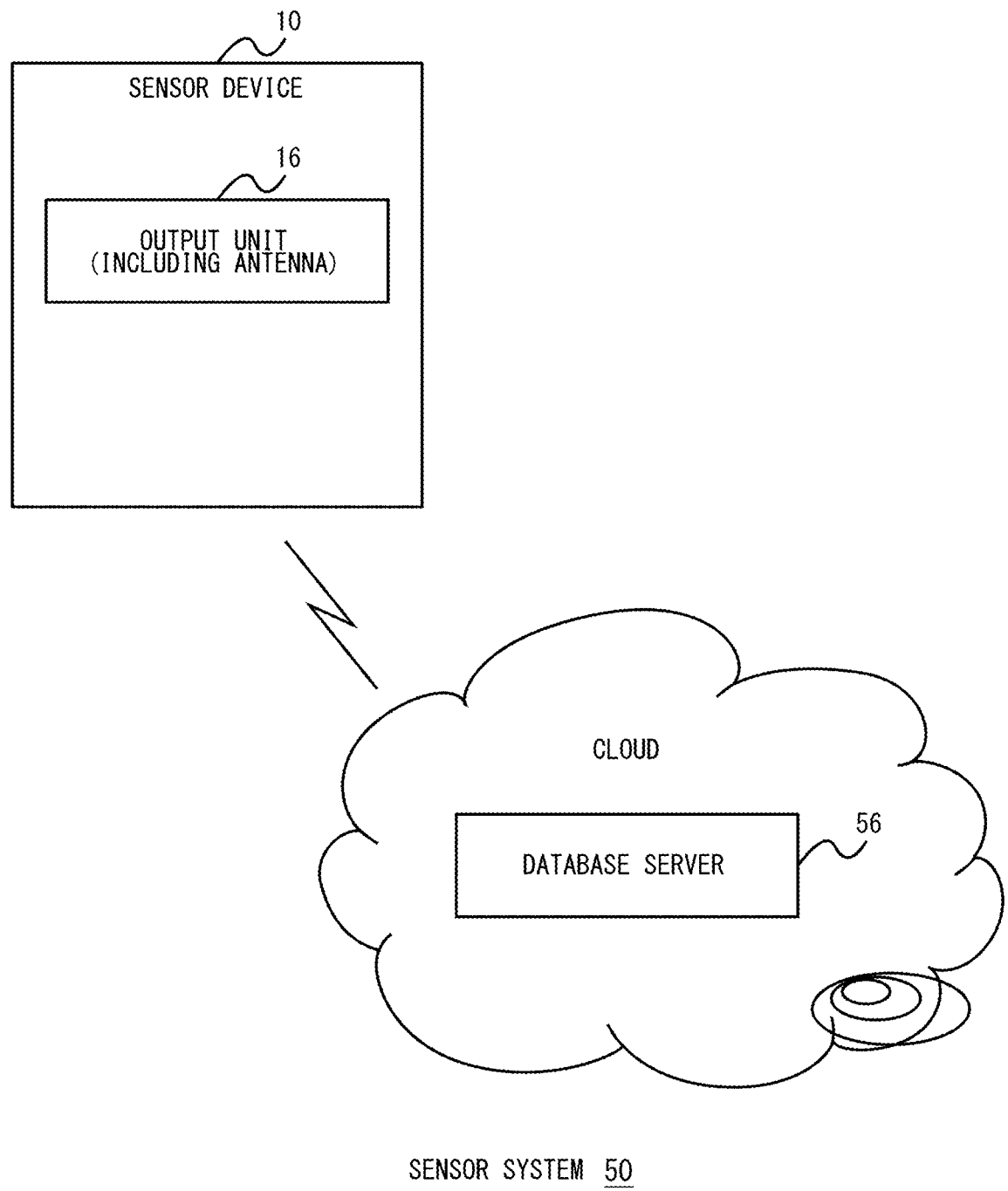
FIG. 22 is a diagram showing the configuration of a sensor system according to an exemplary variation.

Another exemplary variation will be described. The sensor device 10 according to the present exemplary variation may include an output unit 16 (communication unit) capable of long-distance wireless communication with a wireless base station installed in a remote location. FIG. 22 corresponds to FIG. 3 and shows the configuration of a sensor system 50 including a sensor device 10 according to the exemplary variation. In the sensor system 50 according to the exemplary variation, the sensor device 10 directly transmits/receives data to/from a device on the cloud via a wireless base station installed in a remote location. For example, the sensor device 10 may directly transmit output information generated by the own device to a database server 56 on the cloud and store the output information in the database server 56.

Yet another exemplary variation will be described. Elements (hardware and software) for enhancing security are desirably mounted on at least one of the sensor device 10 and a part or the like (hereinafter, also referred to as "mother device") to which the sensor device 10 is attached. The security implementation may include, for example, password authentication and communication by public key cryptosystem.

An example of the security implementation will be described.

(1) Communication (wireless or wired) between the mother device and the sensor device 10 (nomenclature plate) has a possibility of having low security strength.

Therefore, a hole may be made in the attachment surface (nomenclature plate attachment surface) of the sensor device 10 in the mother device, and the sensor device 10 may be arranged in the hole. This makes it difficult for an external device to eavesdrop on the communication between the mother device and the sensor device 10. As described, the reduction of the possibility of leakage of communication between the mother device and the sensor device 10 by the devising of the hardware allows for the operation of communication between the mother device and the sensor device 10 with low security.

(2) High security is required for communication (wireless) between the sensor device 10 and an external base station (cloud).

Since wireless communication systems such as 4G and 5G are so-called closed networks, no problem occurs. On the other hand, in the case of Wi-Fi or the like, at least password authentication is desirably implemented, and more preferably, communication by a public key cryptosystem is implemented.

Yet another exemplary variation will be described. The mother device and the sensor device 10 may be connected by wire, the mother device may supply electric power to the sensor device 10, and the sensor device 10 may monitor the normality of the power source in the mother device based on the electric power (voltage) supplied from the mother device. When predetermined electric power (voltage) from the mother device is not supplied, the sensor device 10 may detect that and store output information indicating a power source abnormality of the mother device or output the output information to the outside. The mother device may supply electric power for operating the sensor device 10. When electric power is not supplied from the mother device, the sensor device 10 may be operated by electric power provided from the energy harvesting unit 22 or the power storage unit 24.

Optional combinations of the aforementioned exemplary embodiments and exemplary variations will also be within the scope of the present invention. New embodiments resulting from the combinations have combined effects of the exemplary embodiments and exemplary variations that are combined. It will be obvious to those skilled in the art that the function to be achieved by each constituent requirement described in the claims are achieved by each constituting element shown in the exemplary embodiments and in the exemplary variations or by a combination of the constituting elements.

The technologies according to the exemplary embodiment and exemplary variations may be defined by the following aspects.

[Item 1]

A sensor device comprising:

a sensor unit that measures a condition related to an object;

an output unit that outputs information that is based on the measurement result from the sensor unit to the outside; and a power generation unit that converts energy that exists in an external environment into electric power and supplies an electric power for operating at least one of the sensor unit and the output unit, wherein the sensor unit, the output unit, and the power generation unit are integrally provided in a sheet shape, and at least two of the sensor unit, the output unit, and the power generation unit are arranged in an overlapping manner.

This aspect eliminates the need to newly provide wiring for supplying electric power to a sensor in an object such as a mechanical component. Thereby, while making it possible to grasp the condition related to an object, it is possible to suppress an increase in the cost and period of time required for manufacturing the object. Further, by arranging at least two of the sensor unit, the output unit, and the power generation unit in an overlapping manner, the size of the sensor device is reduced, allowing for easy attachment to the object.

[Item 2]

The sensor device according to Item 1, further comprising:

a processing unit that generates information output from the output unit based on the measurement result from the sensor unit.

This aspect allows for the processing of the measurement result from the sensor unit so as to output more useful information to the outside. Further, it is possible to generate information in which measurement results from the sensor unit are aggregated, allowing for the reduction in the amount of information to be output to the outside.

[Item 3]

The sensor device according to Item 1 or 2, further comprising:

a storage unit that stores the measurement result from the sensor unit or the information output from the output unit.

This aspect allows the measurement result from the sensor unit or the information output from the output unit to be stored and output at a proper time.

[Item 4]

The sensor device according to Item 3, wherein the storage unit is capable of storing a plurality of measurement results from the sensor unit or a plurality of pieces of information output from the output unit, and the storage unit stores the plurality of measurement results or the plurality of pieces of information in association with a value that changes over time.

This aspect allows the plurality of measurement results or the plurality of pieces of information to be held in chronological order and also allows for the analysis and aggregation in chronological order.

[Item 5]

The sensor device according to any one of Items 1 through 4, wherein the output unit outputs the information to an external device by communication, and the power generation unit supplies electric power based on electromotive force generated by the communication.

This aspect allows the power generation to be achieved along with communication by using NFC or the like.

[Item 6]

The sensor device according to any one of Items 1 through 5, further comprising:

a power supply control unit that controls the supply or disconnection of electric power for at least one of the sensor unit and the output unit.

This aspect allows for the efficient use of generated electric power.

[Item 7]

The sensor device according to Item 2, wherein the processing unit has arithmetic capacity that increases as the number of operation clocks increases and is capable of changing the number of operation clocks according to processing details.

This aspect allows for the efficient use of generated electric power.

[Item 8]

The sensor device according to any one of Items 1 through 7, further comprising:

a power storage unit, wherein at least one of the sensor unit and the output unit is operated by electric power supplied from the power generation unit and electric power supplied from the power storage unit.

This aspect allows the operation of the sensor unit and the operation of the output unit to continue even when the electric power supplied from the power generation unit is temporarily reduced.

[Item 9]

The sensor device according to any one of Items 1 through 8, wherein the sensor unit has a plurality of sensors that measure different types of physical quantities.

This aspect allows various types of information based on many types of physical quantities to be output.

[Item 10]

The sensor device according to Item 2, wherein the sensor unit includes a plurality of sensors that are arranged apart from one another and has a plurality of sensors that measure the same type of physical quantity, and the processing unit generates the information based on measurements results from the plurality of sensors.

This aspect allows various types of information related to an object to be output based on measurement results from a plurality of sensors. For example, when a sensor device is attached to the surface of an object (such as the case of a nomenclature plate or the like), the physical phenomenon inside the object can be accurately estimated based on the physical phenomenon on or near the surface of the object measured by a plurality of sensors.

[Item 11]

The sensor device according to any one of Items 1 through 10, wherein the power generation unit has a plurality of power generation means.

According to this aspect, even when electric power obtained from one power generation means is reduced, the operation can be continued by electric power obtained from another power generation means.

[Item 12]

The sensor device according to any one of Items 1 through 11, wherein the output unit includes electronic paper.

According to this aspect, information can be output to the outside while suppressing power consumption.

[Item 13]

The sensor device according to any one of Items 1 through 12, wherein the output unit includes an antenna.

According to this aspect, information can be transmitted to an external device by communication.

[Item 14]

The sensor device according to any one of Items 1 through 13, further comprising:

a fastening part that is for fixing the sensor device to the object and that is inserted into the object, wherein the sensor unit is connected to the fastening part.

According to this aspect, since the fastening part functions as a probe, the physical phenomenon inside the object can be acquired without providing a sensor unit inside the object.

[Item 15]

The sensor device according to any one of Items 1 through 14, wherein the sensor unit includes a strain gauge, and at least a part where the strain gauge is arranged is made of a stretchable material and is fixed to the object by adhesion.

According to this aspect, information on the distortion of the object can be obtained.

[Item 16]

A sensor device comprising:

a sensor unit that measures temperature, humidity, and vibration of an object or the surroundings of the object;

an output unit that outputs information that is based on the measurement result from the sensor unit to the outside by wireless communication; and a power generation unit that generates electric power based on Wi-Fi (registered trademark) radio waves, near field communication (NFC) radio waves, or light so as to supply electric power that operates at least one of the sensor unit and the output unit.

This aspect eliminates the need to newly provide wiring for supplying electric power to a sensor in an object such as a mechanical component. Thereby, while making it possible to grasp the condition related to an object, it is possible to suppress an increase in the cost and period of time required for manufacturing the object.

[Item 17]

A speed reducer comprising:

a speed reduction mechanism;

a case that houses the speed reduction mechanism;

a sensor unit that measures a condition related to the case;

an output unit that outputs information that is based on the measurement result from the sensor unit to the outside; and a power generation unit that converts energy that exists in an external environment into electric power and supplies an electric power for operating at least one of the sensor unit and the output unit.

This aspect eliminates the need to newly provide wiring for supplying electric power to a sensor in a speed reducer.

Thereby, while making it possible to grasp the condition related to a speed reducer, it is possible to suppress an increase in the cost and period of time required for manufacturing the speed reducer.

[Item 18]

A traveling unit for a crawler, comprising:
a traveling control unit that controls the operation of the crawler;
a case that houses the traveling control unit;
a sensor unit that measures a condition related to the case;
an output unit that outputs information that is based on the measurement result from the sensor unit to the outside; and
a power generation unit that converts energy that exists in an external environment into electric power and supplies an electric power for operating at least one of the sensor unit and the output unit.

This aspect eliminates the need to newly provide wiring for supplying electric power to a sensor in a traveling unit for a crawler. Thereby, while making it possible to grasp the condition related to a traveling unit for a crawler, it is possible to suppress an increase in the cost and period of time required for manufacturing the traveling unit for a crawler.

[Item 19]

A fluid valve comprising:
a valve unit that controls the flow of fluid;
a case that houses the valve unit;
a sensor unit that measures a condition related to the case;
an output unit that outputs information that is based on the measurement result from the sensor unit to the outside; and
a power generation unit that converts energy that exists in an external environment into electric power and supplies an electric power for operating at least one of the sensor unit and the output unit.

This aspect eliminates the need to newly provide wiring for supplying electric power to a sensor in a fluid valve. Thereby, while making it possible to grasp the condition related to a fluid valve, it is possible to suppress an increase in the cost and period of time required for manufacturing the fluid valve.

[Item 20]

A fluid cylinder comprising:
a cylinder unit that houses fluid;
a case that houses the cylinder unit;
a sensor unit that measures a condition related to the case;
an output unit that outputs information that is based on the measurement result from the sensor unit to the outside; and
a power generation unit that converts energy that exists in an external environment into electric power and supplies an electric power for operating at least one of the sensor unit and the output unit.

This aspect eliminates the need to newly provide wiring for supplying electric power to a sensor in a fluid cylinder. Thereby, while making it possible to grasp the condition related to a fluid cylinder, it is possible to suppress an increase in the cost and period of time required for manufacturing the fluid cylinder.

[Item 21]

A fluid pump comprising:
a pump unit that controls the flow of fluid;
a case that houses the pump unit;
a sensor unit that measures a condition related to the case;
an output unit that outputs information that is based on the measurement result from the sensor unit to the outside; and
a power generation unit that converts energy that exists in an external environment into electric power and supplies an electric power for operating at least one of the sensor unit and the output unit.

This aspect eliminates the need to newly provide wiring for supplying electric power to a sensor in a fluid pump. Thereby, while making it possible to grasp the condition related to a fluid pump, it is possible to suppress an increase in the cost and period of time required for manufacturing the fluid pump.

[Item 22]

A fluid compressor comprising:
a compression unit that applies pressure to fluid;
a case that houses the compression unit;
a sensor unit that measures a condition related to the case;
an output unit that outputs information that is based on the measurement result from the sensor unit to the outside; and
a power generation unit that converts energy that exists in an external environment into electric power and supplies an electric power for operating at least one of the sensor unit and the output unit.

This aspect eliminates the need to newly provide wiring for supplying electric power to a sensor in a fluid compressor. Thereby, while making it possible to grasp the condition related to a fluid compressor, it is possible to suppress an increase in the cost and period of time required for manufacturing the fluid compressor.

[Item 23]

An electric motor comprising:
a motor unit that converts electrical energy into mechanical energy;
a case that houses the motor unit;
a sensor unit that measures a condition related to the case;
an output unit that outputs information that is based on the measurement result from the sensor unit to the outside; and
a power generation unit that converts energy that exists in an external environment into electric power and supplies the electric power as electric power for operating at least one of the sensor unit and the output unit.

This aspect eliminates the need to newly provide wiring for supplying electric power to a sensor in an electric motor. Thereby, while making it possible to grasp the condition related to an electric motor, it is possible to suppress an increase in the cost and period of time required for manufacturing the electric motor.

[Item 24]

An electric actuator comprising:
a drive unit that operates based on electrical energy;
a case that houses the drive unit;
a sensor unit that measures a condition related to the case;
an output unit that outputs information that is based on the measurement result from the sensor unit to the outside; and
a power generation unit that converts energy that exists in an external environment into electric power and supplies an electric power for operating at least one of the sensor unit and the output unit.

This aspect eliminates the need to newly provide wiring for supplying electric power to a sensor in an electric actuator. Thereby, while making it possible to grasp the condition related to an electric actuator, it is possible to suppress an increase in the cost and period of time required for manufacturing the electric actuator.

[Item 25]

A construction comprising:
a predetermined physical structure;
a sensor unit that measures a condition related to the physical structure;
an output unit that outputs information that is based on the measurement result from the sensor unit to the outside; and
a power generation unit that converts energy that exists in an external environment into electric power and supplies an electric power for operating at least one of the sensor unit and the output unit, wherein
the sensor unit, the output unit, and the power generation unit are integrally provided in a sheet shape, and at least two of the sensor unit, the output unit, and the power generation unit are arranged in an overlapping manner.

This aspect eliminates the need to newly provide wiring for supplying electric power to a sensor in furniture. Thereby, while making it possible to grasp the condition related to furniture, it is possible to suppress an increase in the cost and period of time required for manufacturing the furniture. Further, by arranging at least two of the sensor unit, the output unit, and the power generation unit in an overlapping manner, the size of the sensor device is reduced, allowing for easy attachment to the object.

[Item 26]

A method performed by a sensor device that comes into contact with an object having a predetermined physical structure, comprising:
detecting performed by measuring a condition related to the object;
outputting information that is based on the measurement result in the detecting to the outside; and
converting energy that exists in an external environment into electric power and supplying electric power for executing at least one of the respective processes of the detecting and the outputting.

This aspect eliminates the need to newly provide wiring for supplying electric power to a sensor in an object such as a mechanical component. Thereby, while making it possible to grasp the condition related to an object, it is possible to suppress an increase in the cost and period of time required for manufacturing the object.

[Item 27]

The method according to Item 26 performed by the sensor device, further comprising:
storing the detection result in the detecting or the information output in the outputting in a storage unit; and
deleting data stored in the storage unit when a predetermined instruction is input.

According to this aspect, a sensor device can be reused by deleting data stored in a storage unit based on an instruction from the outside. For example, a sensor device used in one object can be attached to another object for use.

[Item 28]

A method performed by a sensor device attached to a part, comprising:
using electric power generated by the sensor device so as to detect a condition related to the part during the transportation or storage of the part; and
outputting information that is based on the detection result to the outside.

This aspect eliminates the need to newly provide wiring for supplying electric power to a sensor in an object such as a mechanical component. Thereby, while making it possible to grasp the condition related to an object, it is possible to suppress an increase in the cost and period of time required for manufacturing the object.

[Item 29]

A sensor system comprising:
an object having a predetermined physical structure; and
a sensor device attached to the object, wherein
the sensor device includes:
a sensor unit that measures a condition related to the object;
an output unit that outputs information that is based on the measurement result from the sensor unit to the outside; and
a power generation unit that converts energy that exists in an external environment into electric power and supplies an electric power for operating at least one of the sensor unit and the output unit, and
the sensor unit, the output unit, and the power generation unit are integrally provided in a sheet shape, and at least two of the sensor unit, the output unit, and the power generation unit are arranged in an overlapping manner.

This aspect eliminates the need to newly provide wiring for supplying electric power to a sensor in an object such as a mechanical component. Thereby, while making it possible to grasp the condition related to an object, it is possible to suppress an increase in the cost and period of time required for manufacturing the object. Further, by arranging at least two of the sensor unit, the output unit, and the power generation unit in an overlapping manner, the size of the sensor device is reduced, allowing for easy attachment to the object.

[Item 30]

A sensor system comprising:
an object having a predetermined physical structure; and
a plurality of sensor devices attached to the object, wherein
each of the plurality of sensor devices includes:
a sensor unit that measures a condition related to the object;
an output unit that outputs information that is based on the measurement result from the sensor unit to the outside; and
a power generation unit that converts energy that exists in an external environment into electric power and supplies an electric power for operating at least one of the sensor unit and the output unit, and
the sensor unit, the output unit, and the power generation unit are integrally provided in a sheet shape, and at least two of the sensor unit, the output unit, and the power generation unit are arranged in an overlapping manner.

This aspect eliminates the need to newly provide wiring for supplying electric power to a sensor in an object such as a mechanical component. Thereby, while making it possible to grasp the condition related to an object, it is possible to suppress an increase in the cost and period of time required for manufacturing the object. Further, by attaching a plurality of sensor devices to the object, the condition of the object at a plurality of locations can be grasped, and the condition of the object (internal condition, etc.) can be estimated more accurately according to the condition of the object at the plurality of locations. Furthermore, by arranging at least two of the sensor unit, the output unit, and the power generation unit in an overlapping manner, the size of the sensor device is reduced, allowing for easy attachment to the object.

[Item 31]

A nomenclature plate that is attached to an article and on which information related to the article is displayed, comprising:

a sensor unit that measures the condition of the article;

an output unit that outputs information that is based on the measurement result from the sensor unit to the outside; and a power generation unit that converts energy that exists in an external environment into electric power and supplies an electric power for operating at least one of the sensor unit and the output unit, wherein at least two of the sensor unit, the output unit, and the power generation unit are arranged in an overlapping manner.

This aspect eliminates the need to newly provide wiring for supplying electric power to a sensor in an article such as a mechanical component. Further, it is not necessary to newly secure an area for storing a sensor on or in the housing of the article. Thereby, while making it possible to grasp the condition related to an article, it is possible to suppress an increase in the cost and period of time required for manufacturing the article. Further, by arranging at least two of the sensor unit, the output unit, and the power generation unit in an overlapping manner, the size of the nomenclature plate is reduced, allowing for easy attachment to the object.

What is claimed is:

1. A sensor device comprising:

a sensor unit that measures a condition related to an object;

an output unit that outputs information that is based on the measurement result from the sensor unit to the outside; and a power generation unit that converts energy that exists in an external environment into electric power and supplies an electric power for operating at least one of the sensor unit and the output unit; and a storage unit that stores the measurement result from the sensor unit or the information output from the output unit, wherein the sensor unit, the output unit, and the power generation unit are integrally provided in a sheet shape, and at least two of the sensor unit, the output unit, and the power generation unit are arranged in an overlapping manner, the storage unit is capable of storing a plurality of measurement results from the sensor unit or a plurality of pieces of information output from the output unit, the storage unit stores the plurality of measurement results or the plurality of pieces of information in association with a value that changes over time, the sensor unit includes a strain gauge that measures a deformation of the object, and when a measurement result of the strain gauge indicates a stress of a predetermined magnitude and direction, it is determined that the stress is generated by an operation on an outer surface of the sensor device.

2. The sensor device according to claim 1, further comprising:

a processing unit that generates information output from the output unit based on the measurement result from the sensor unit.

3. The sensor device according to claim 1, wherein the output unit outputs the information to an external device by communication, and the power generation unit supplies electric power based on electromotive force generated by the communication.

4. The sensor device according to claim 1, further comprising:

a power supply control unit that controls the supply or disconnection of electric power for at least one of the sensor unit and the output unit.

5. The sensor device according to claim 2, wherein the processing unit has arithmetic capacity that increases as the number of operation clocks increases and is capable of changing the number of operation clocks according to processing details.

6. The sensor device according to claim 1, further comprising:

a power storage unit, wherein at least one of the sensor unit and the output unit is operated by electric power supplied from the power generation unit and electric power supplied from the power storage unit.

7. The sensor device according to claim 1, wherein the sensor unit has a plurality of sensors that measure different types of physical quantities.

8. The sensor device according to claim 2, wherein the sensor unit includes a plurality of sensors that are arranged apart from one another and has a plurality of sensors that measure the same type of physical quantity, and the processing unit generates the information based on measurements results from the plurality of sensors.

9. The sensor device according to claim 1, wherein the power generation unit has a plurality of power generation means.

10. The sensor device according to claim 1, wherein the output unit includes electronic paper.

11. The sensor device according to claim 1, wherein the output unit includes an antenna.

12. The sensor device according to claim 1, further comprising:

a fastening part that is for fixing the sensor device to the object and that is inserted into the object, wherein the sensor unit is connected to the fastening part.

13. The sensor device according to claim 1, wherein at least a part where the strain gauge is arranged is made of a stretchable material and is fixed to the object by adhesion.

* * * * *